United States Patent
Li

(10) Patent No.: US 11,146,453 B2
(45) Date of Patent: Oct. 12, 2021

(54) METHOD AND APPARATUS FOR CREATING NETWORK SLICE, AND COMMUNICATIONS SYSTEM

(71) Applicant: HUAWEI TECHNOLOGIES CO., LTD., Guangdong (CN)

(72) Inventor: Zhuoming Li, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/680,991

(22) Filed: Nov. 12, 2019

(65) Prior Publication Data

US 2020/0084107 A1 Mar. 12, 2020

Related U.S. Application Data

(63) Continuation of application No. PCT/CN2017/085368, filed on May 22, 2017.

(51) Int. Cl.
 *H04L 12/24* (2006.01)
 *H04L 29/06* (2006.01)
 *G06F 9/455* (2018.01)

(52) U.S. Cl.
 CPC ...... *H04L 41/0893* (2013.01); *G06F 9/45558* (2013.01); *H04L 41/0806* (2013.01);
 (Continued)

(58) Field of Classification Search
 CPC ............. H04L 29/08; H04L 41/0896; H04L 41/5048; H04L 41/0806; H04L 65/1073;
 (Continued)

(56) References Cited

U.S. PATENT DOCUMENTS

| 2016/0006623 A1* | 1/2016 | Liu | H04L 43/0876 370/254 |
|---|---|---|---|
| 2016/0050120 A1* | 2/2016 | Liu | H04L 41/0886 370/254 |

(Continued)

FOREIGN PATENT DOCUMENTS

| CN | 104639653 A | 5/2015 |
|---|---|---|
| JP | 2017011467 A | 1/2017 |

(Continued)

OTHER PUBLICATIONS

Huawei,"Configuration of RAN Transport network related information",3GPP TSG SA WG5 (Telecom Management) Meeting #112, XP051258909, S5-171664, Mar. 27-31, 2017, Guilin, China, 3 pages.

(Continued)

*Primary Examiner* — Abdullahi E Salad
(74) *Attorney, Agent, or Firm* — Fish & Richardson P.C.

(57) ABSTRACT

Embodiments of the present invention provide a method, an apparatus, and a system for creating a network slice. The method includes: receiving, by a network slice control function (NSCF) entity, a service deployment command sent by a network slice management function NSMF entity; obtaining, by the NSCF entity, a service-related requirement parameter, a model, a policy, and a plan of a network slice, and registration information of a network function entity based on the service deployment command; generating, by the NSCF entity, a service configuration scheme of the network function entity based on the model and the policy of the network slice and one or more of the service-related requirement parameter, the registration information of the network function entity, and the plan of the network slice; and sending, by the NSCF entity, the service configuration (Continued)

scheme to the network function entity. Therefore, a network slice can be automatically created.

20 Claims, 9 Drawing Sheets

(52) U.S. Cl.
CPC ...... *H04L 41/0896* (2013.01); *H04L 65/1073* (2013.01); *G06F 2009/45595* (2013.01)

(58) Field of Classification Search
CPC ............. H04L 41/0893; H04L 41/5054; G06F 9/45558; G06F 2009/45595; H04W 48/16
See application file for complete search history.

(56) References Cited

U.S. PATENT DOCUMENTS

| | | | |
|---|---|---|---|
| 2016/0371063 A1* | 12/2016 | Chiosi | ...................... G06F 8/41 |
| 2017/0054595 A1* | 2/2017 | Zhang | ..................... H04L 41/12 |
| 2017/0102931 A1* | 4/2017 | Risbood | ................ G06F 9/4492 |
| 2017/0163587 A1* | 6/2017 | Johnson | ................ H04L 47/781 |

FOREIGN PATENT DOCUMENTS

| | | |
|---|---|---|
| JP | 2017538357 A | 12/2017 |
| WO | 2016118636 A1 | 7/2016 |
| WO | 2016121834 A1 | 8/2016 |
| WO | 2017057025 A1 | 4/2017 |
| WO | 2017076086 A1 | 5/2017 |

OTHER PUBLICATIONS

Huawei et al.,"Add general requirements for network slice management",3GPP TSG SA WG5 (Telecom Management) Meeting #113, XP051289996, S5-173437, West Palm Beach, Florida(US), May 8-12, 2017, 3 pages.
Huawei"pCR TR 28.801 generic customer service provision solution",3GPP TSG SA WG5 (Telecom Management) Meeting #113,XP051290003, S5-173445, West Palm Beach, Florida (US), May 8-12, 2017, 3 pages.
Extended European Search Report issued in European Application No. 17911014.3 dated Mar. 20, 2020, 11 pages.
Office Action issued in Chinese Application No. 201780089288.6 dated May 15, 2020, 12 pages (with English translation).
3GPP TR 28.801 V1.1.0 (Mar. 2017), "3rd Generation Partnership Project; Technical Specification Group Services and System Aspects; Telecommunication management; Study on management and orchestration of network slicing for next generation network (Release 14)," Mar. 2017, 60 pages.
PCT International Search Report and Written Opinion issued in International Application No. PCT/CN2017/085368 dated Jan. 31, 2018, 15 pages (with English translation).
S5-171660—Huawei, "Update on network slice concepts," 3GPP TSG SA WG5 (Telecom Management) Meeting #112 Guilin, China, Mar. 27-31, 2017, 4 pages.
S5-166184—Orange, "pCR TR 28.800— Model of roles, use cases and architecture for network slice management," 3GPP TSG SA WG5 (Telecom Management) Meeting #110, Reno, USA, Nov. 14-18, 2016, 6 pages.
Hasegawa et al., "Network Platform for Creating Services over Virtualized Networks," The Institute of Electronics, Information and Communication Engineers, IEICE Technical Report, Oct. 2010, 8 pages.
Office Action issued in Japanese Application No. 2019-564046 dated Dec. 15, 2020, 5 pages (with English translation).

* cited by examiner

METHOD AND APPARATUS FOR CREATING NETWORK SLICE, AND COMMUNICATIONS SYSTEM

CROSS-REFERENCE TO RELATED APPLICATIONS

This application is a continuation of International Application No. PCT/CN2017/085368, filed on May 22, 2017, the disclosure of which is hereby incorporated by reference in its entirety.

TECHNICAL FIELD

This application relates to the communications field, and more specifically, to a method and an apparatus for creating a network slice, and a communications system.

BACKGROUND

A future communications system can support a plurality of different service types, for example, an enhanced mobile broadband (eMBB) service, an ultra-reliable and low latency communications (uRLLC) service, and a massive machine type communications (mMTC) service. Different service types have different characteristics and network requirements. For example, applications such as virtual reality (VR) and augmented reality (AR) technologies of the eMBB have an extremely high bandwidth requirement, an application such as self driving of the uRLLC is latency-sensitive, and the mMTC has an extremely high connection density. Therefore, to improve network communication efficiency and meet different communication service requirements, a network may be divided into a plurality of network slice instances, and each network slice instance provides a corresponding network service.

A plurality of virtual network function (VNF) instances may be deployed in one physical network slice instance, and each VNF instance may provide one type of network service. Each network slice instance has a service configuration script corresponding to the network slice instance, and the service configuration script corresponding to the network slice instance is related to an infrastructure in which the network slice instance is located, and is also related to configuration of a to-be-connected adjacent network and a network plan of an operator.

In the prior art, a network slice management function (NSMF) entity prepares a network slice template in advance, and generates, based on a network slice order delivered by a user, a script file for creating a network slice instance. The script file includes a resource deployment script and a service configuration script. The resource deployment script describes an infrastructure resource allocated to a network function, a loaded network function software image, and a connection between network functions. The service configuration script includes a service deployment command for a network function entity. The NSMF sends the resource deployment script to a network functions virtualization management and orchestration (NFV-MANO) function entity. Based on the resource deployment script, the NFV-MANO allocates a resource on a network functions virtualization infrastructure (NFV Infrastructure), deploys corresponding VNF entities in the network slice, and connects the VNFs. Then, the NSMF sends the service configuration script to an element management system (EMS) entity. The EMS executes a related service deployment command on a VNF and a physical network function (PNF) of the network slice based on the script, so that a service required in a customer order can normally run on the slice. In this way, a network slice is created.

The service configuration script needs to be correspondingly adjusted in terms of configuration based on a deployment plan, to be coupled to the resource deployment script. Slice deployment is usually closely related to a plan for the site, and this further implements coupling between the service configuration script and a specific plan for each site. If deployment is performed at a location of another site, the service configuration script needs to be rewritten. This is very inflexible, is difficult to implement automation, and cannot implement a plurality of times of deployment through one-time design of a network slice.

SUMMARY

The present invention provides a method, an apparatus, and a system for creating a network slice, so that the system can automatically generate a corresponding network slice service configuration scheme based on a pre-designed model and policy of a network slice, a plan of a network slice at each site, and registration information of a network function entity, to implement automation of a network slice creation process and implement a plurality of times of deployment through one-time design.

This application provides a method and an apparatus for creating a network slice, and a communications system, to meet a requirement for a plurality of times of deployment through one-time design.

According to a first aspect, a network control method is provided, including: receiving, by a network slice control function (NSCF) entity, a service deployment command sent by a network slice management function entity; obtaining, by the NSCF entity, a service-related requirement parameter, a model, a policy, and a plan of a network slice, and registration information of a network function entity based on the service deployment command, where the service-related requirement parameter and the model, the policy, and the plan of the network slice are from the NSMF entity, and the registration information is from the network function entity; generating, by the NSCF entity, a service configuration scheme of the network function entity based on the model and the policy of the network slice and one or more of the service-related requirement parameter, the registration information of the network function entity, and the plan of the network slice; and sending the service configuration scheme to the network function entity. In this way, the network function entity can directly perform service configuration based on the service configuration scheme, and there is no need to manually configure the network function entity, thereby implementing automation of a network slice creation process.

Optionally, the network function entity may be a virtual network function VNF entity, a physical network function PNF entity, or a network function service instance running on a VNF service framework. Different network function entities may have different registration information. For the VNF entity or the network function service instance running on the VNF service framework, the registration information includes a network location, a connection topology, and resource information of the network function entity. For the PNF entity, the registration information may be a network location and a connection topology of the network function entity. The resource information may include a virtual machine resource occupied by the VNF entity and an allocated network interface bandwidth, or a virtual machine resource occupied by the VNF service framework and an allocated network interface bandwidth. Based on the registration information reported by the network function entity, the NSCF entity can learn of related information of the current network function entity, to automatically perform service configuration for the network function entity.

Optionally, the model of the network slice includes one or more of a network model, a resource model, and a service model. The network model is used to indicate network function entities required by each service in a network slice instance and a logical connection relationship between the network function entities. The resource model is used to indicate a correspondence between a service scale and a resource quantity and a correspondence between the service scale and a network bandwidth magnitude. The service model is used to indicate service configuration of a network function entity and a related coordination relationship between network function entities in terms of service configuration. The policy of the network slice includes one or more of a network policy, a resource policy, and a service policy. The network policy includes location requirement rules of various network function entities in a network slice instance and a performance requirement rule of a network bandwidth and a latency between the network function entities. The resource policy includes a resource occupation rule of a network function entity and a bandwidth use rule of a link of a physical network entity. The service policy includes a rule of determining, based on the plan of the network slice and registration information of a network function entity, how to perform service configuration for the network function entity. The plan of the network slice includes one or more of the following: a connection plan of a network slice instance and an adjacent network and a plan of an internet protocol (IP) address of the network slice instance.

Optionally, the generating, by the NSCF entity, a service configuration scheme of the network function entity based on the model and the policy of the network slice and one or more of the service-related requirement parameter, the registration information of the network function entity, and the plan of the network slice specifically includes: determining, by the NSCF entity based on the network model and one or more of the service-related requirement parameter, the registration information of the network function entity, and the plan of the network slice, a network configuration relationship between network function entities that have been deployed, so that the network policy is met; determining, based on the service model, the network configuration relationship, and one or more of the service-related requirement parameter, the registration information of the network function entity, and the plan of the network slice, a service configuration relationship between the network function entities that have been deployed, so that the service policy is met; determining, based on the resource model and one or more of the service-related requirement parameter, the registration information of the network function entity, and the plan of the network slice, a resource configuration relationship between the network function entities that have been deployed, so that the resource policy is met; and obtaining a specific service deployment configuration scheme of each of the network function entities. The NSCF entity performs, by using different models and information, configuration processing corresponding to a network function entity model, so that a deployed configuration relationship meets a corresponding policy, thereby further implementing automatic deployment of service configuration.

Optionally, the method further includes: generating, by the NSCF entity, an infrastructure network configuration scheme for a virtualized or cloudified infrastructure on which the VNF entity is borne, where the infrastructure network configuration scheme includes switched-network configuration, route configuration, and virtual-interface configuration of the infrastructure; and sending the infrastructure network configuration scheme to an orchestration entity. In this way, the orchestration entity can perform automatic infrastructure network configuration for the network function entity based on the infrastructure network configuration scheme.

Optionally, the method further includes: receiving, by the NSCF entity, the service deployment command; obtaining the service-related requirement parameter, and the model, the policy, and the plan of the network slice; generating a network function service configuration scheme based on the service-related requirement parameter, the model, the policy, and the plan of the network slice, and registration information of the VNF service framework, where the network service configuration scheme includes a type of a network function service that needs to be deployed on each VNF service framework, and a quantity of network function service instances of each type; and sending, to the VNF service framework, a network function service deployment message that includes the network function service configuration scheme. In this way, the VNF service framework can perform automatic network function service configuration based on the network function service configuration scheme.

According to a second aspect, the present invention provides another method for creating a network slice, including: sending, by an NSMF entity, a service deployment command to an NSCF; and receiving, by the NSMF entity, a network slice creation complete indication sent by the NSCF entity. The NSMF entity instructs the NSCF entity to perform service configuration, thereby implementing automation of network slice creation.

Optionally, the method further includes: sending, by the NSMF entity, the service-related requirement parameter and a model, a policy, and a plan of a network slice to the NSCF entity.

Optionally, the method further includes: sending, by the NSMF entity, the service-related requirement parameter, the model of the network slice, and a deployment template to an orchestration entity.

According to a third aspect, the present invention provides another method for creating a network slice, including: receiving, by an orchestration entity, a resource deployment command sent by the NSMF entity; and deploying a VNF entity on an infrastructure and configuring a network connection of the VNF entity, according to the resource deployment command; or deploying a VNF service framework on an infrastructure and configuring a network connection of the VNF service framework, according to the resource deployment command. The orchestration entity may deploy the VNF entity or the VNF service framework according to the resource deployment command, thereby implementing automation of VNF deployment in a network slice creation process.

According to a fourth aspect, an apparatus for creating a network slice, namely, an NSCF entity, is provided, and is configured to perform the method in any one of the first aspect or the possible implementations of the first aspect.

Specifically, the network slice control function entity includes a unit configured to perform the method in any one of the first aspect or the possible implementations of the first aspect.

According to a fifth aspect, a network slice management function entity is provided, and is configured to perform the method in any one of the second aspect or the possible implementations of the second aspect.

Specifically, the network slice management entity includes a unit configured to perform the method in any one of the second aspect or the possible implementations of the second aspect.

According to a sixth aspect, an orchestration entity is provided, and is configured to perform the method in the third aspect.

Specifically, the orchestration entity includes a unit configured to perform the method in the third aspect.

According to a seventh aspect, another apparatus for creating a network slice, namely, an NSCF entity, is provided, including a memory and a processor. The memory is configured to store an instruction. The processor is configured to execute the instruction stored in the memory. When the processor executes the instruction stored in the memory, the processor performs the method in any one of the first aspect or the possible implementations of the first aspect.

According to an eighth aspect, another network slice management entity is provided, including a memory and a processor. The memory is configured to store an instruction. The processor is configured to execute the instruction stored in the memory. When the processor executes the instruction stored in the memory, the processor performs the method in any one of the second aspect or the possible implementations of the second aspect.

According to a ninth aspect, another network slice management entity is provided, including a memory and a processor. The memory is configured to store an instruction. The processor is configured to execute the instruction stored in the memory. When the processor executes the instruction stored in the memory, the processor performs the method in the third aspect.

According to a tenth aspect, a communications system is provided, including an NSMF entity and an NSCF entity.

Optionally, the NSCF entity may be the apparatus in any one of the fourth aspect or the possible implementations of the fourth aspect, or the NSCF entity may be the apparatus in any one of the seventh aspect or the possible implementations of the seventh aspect.

Optionally, the NSMF entity may be the apparatus in any one of the fifth aspect or the possible implementations of the fifth aspect, or the NSMF entity may be the apparatus in any one of the eighth aspect or the possible implementations of the eighth aspect.

Optionally, the communications system further includes an orchestration entity. The orchestration entity may be the apparatus in any one of the sixth aspect or the possible implementations of the sixth aspect, or the orchestration entity may be the apparatus in any one of the ninth aspect or the possible implementations of the ninth aspect.

According to an eleventh aspect, a computer readable medium is provided, and is configured to store a computer program. The computer program includes an instruction used to perform the method in any one of the first aspect or the possible implementations of the first aspect.

According to a twelfth aspect, a computer readable medium is provided, and is configured to store a computer program. The computer program includes an instruction used to perform the method in any one of the second aspect or the possible implementations of the second aspect.

According to a thirteenth aspect, a computer readable medium is provided, and is configured to store a computer program. The computer program includes an instruction used to perform the method in the third aspect.

DESCRIPTION OF EMBODIMENTS

The following describes technical solutions of this application with reference to the accompanying drawings.

The technical solutions of the embodiments of the present invention may be applied to various communications systems, for example, a global system for mobile communications (GSM), a code division multiple access (CDMA) system, a wideband code division multiple access (WCDMA) system, a general packet radio service (PRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future evolved public land mobile network (PLMN), or a future 5G system.

Figure 1:
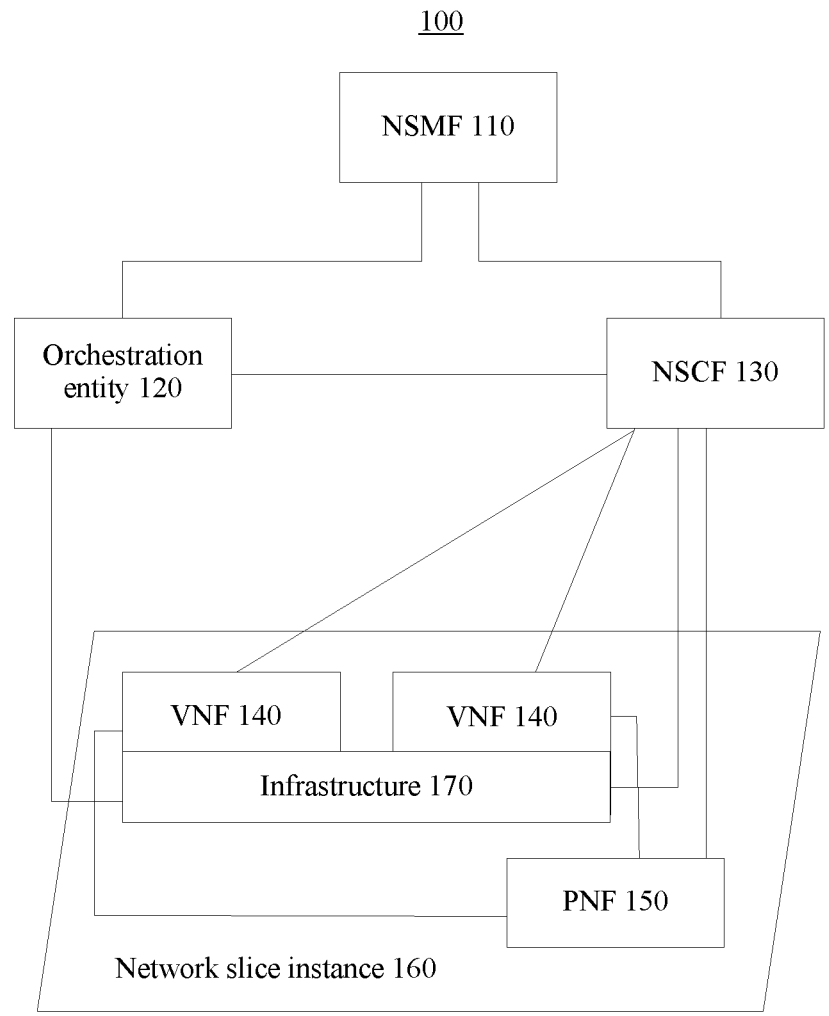
FIG. 1 is a schematic diagram of an example architecture of a communications system to which an embodiment of the present invention is applied.
Figure 2:
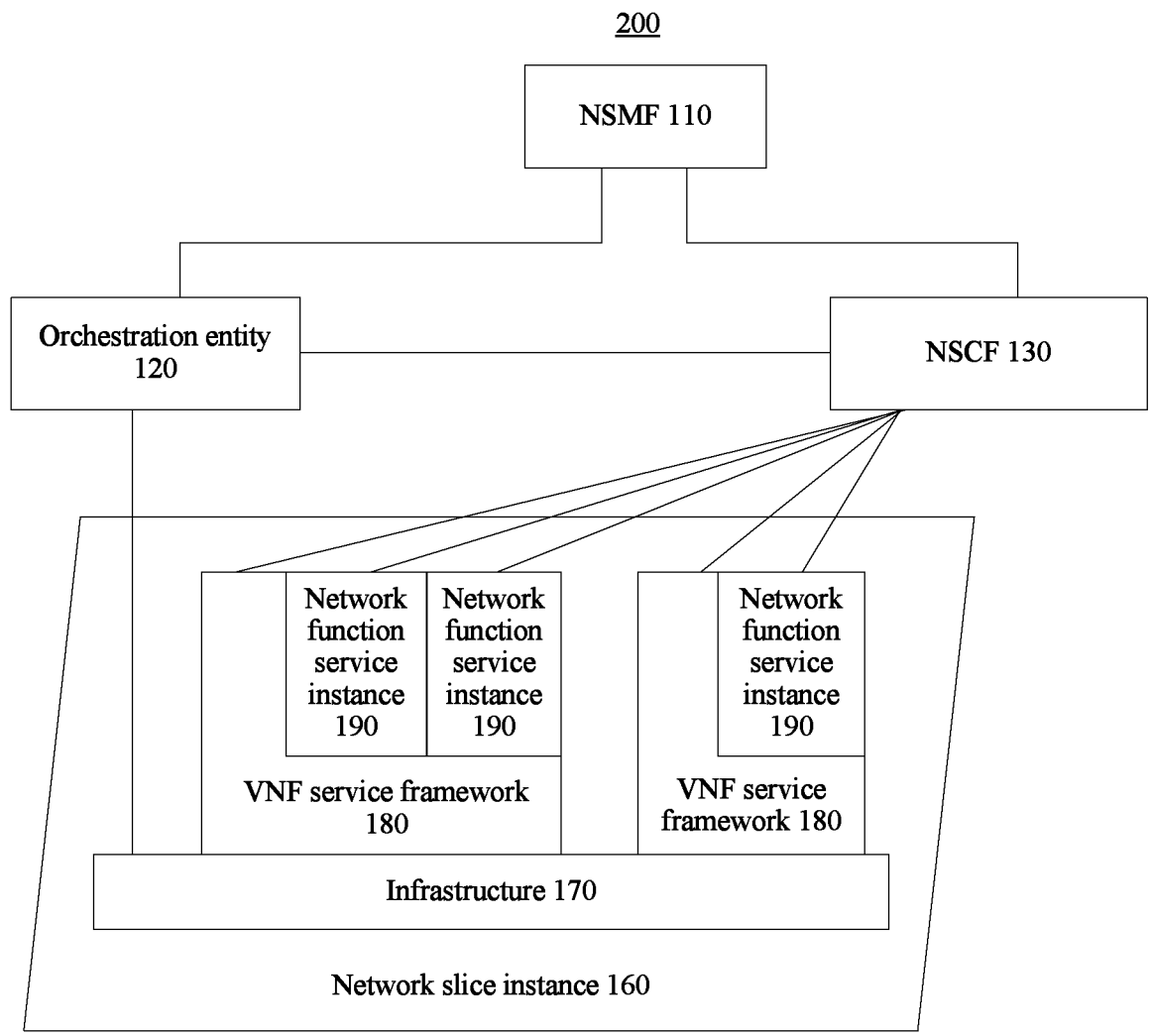
FIG. 2 is a schematic diagram of another example architecture of a communications system to which an embodiment of the present invention is applied.
Figure 3:
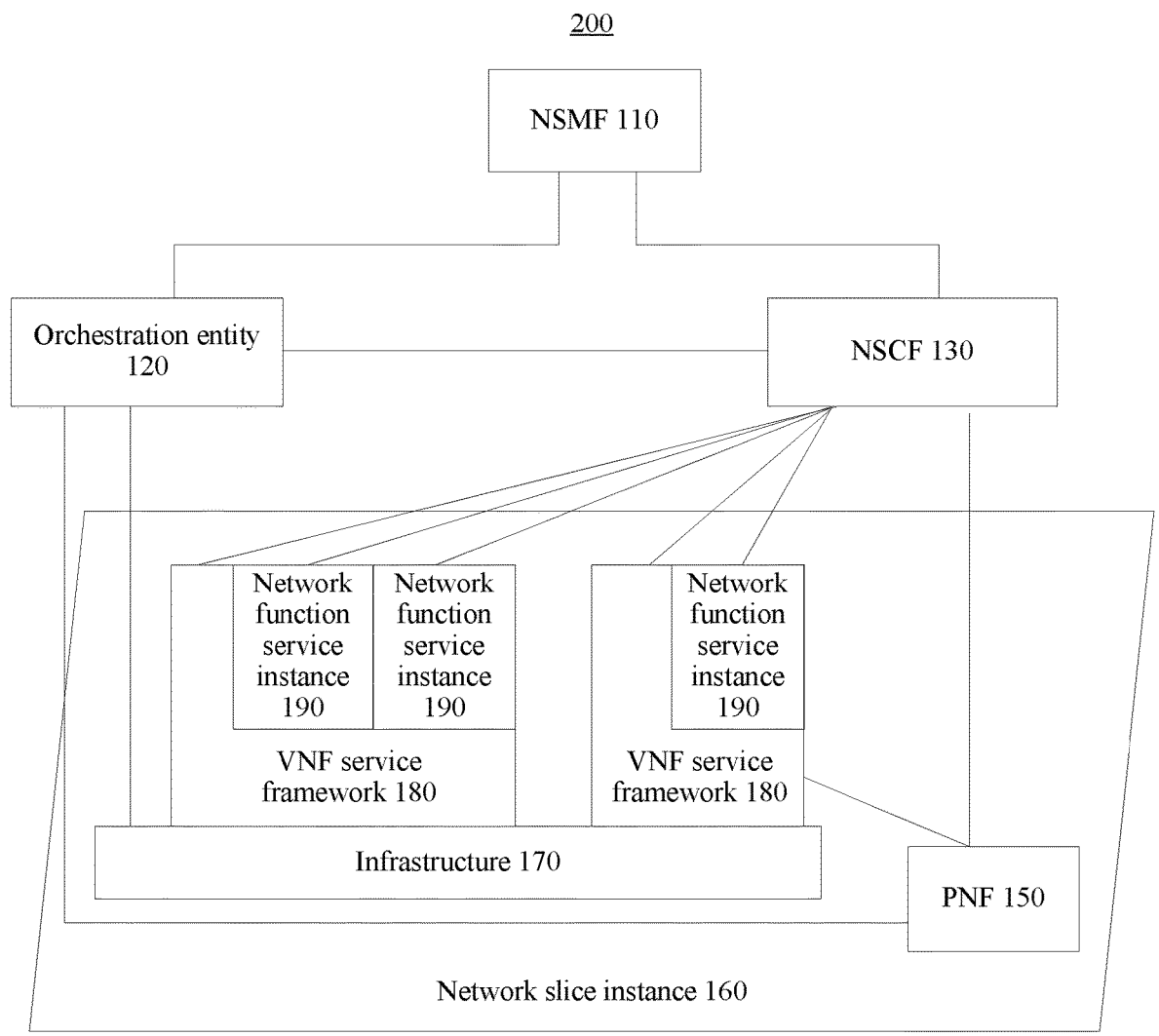
FIG. 3 is a schematic diagram of another example architecture of a communications system according to an embodiment of the present invention.

FIG. 1 shows a communications system 100 to which an embodiment of the present invention is applied. The communications system 100 may include an NSMF entity 110, a virtualized or cloudified orchestration entity 120, an NSCF entity 130, and a network slice instance 160. There may be one or more network slice instances 160 (a plurality of network slice instances 160 are not shown in the figure). Each network slice instance 160 may include a VNF entity 140 created and deployed on a virtualized or cloudified infrastructure 170, and one network slice instance 160 may include one or more VNF entities 140 (as shown in FIG. 1). In some cases, the network slice instance 160 may further include one or more VNF service frameworks (as shown in FIG. 2 or FIG. 3). In some cases, the network slice instance 160 may further include one or more PNF entities 150 (as shown in FIG. 1 or FIG. 3). In some other cases, the network slice instance 160 may alternatively not include a PNF entity 150 (as shown in FIG. 2). In this embodiment of the present invention, the NSMF entity 110 may also be referred to as a network slice management apparatus. The virtualized or cloudified orchestration entity 120 may also be referred to as an orchestration apparatus or a virtualized or cloudified orchestration apparatus. The NSCF entity 130 may also be referred to as an apparatus for creating a network slice or a network control apparatus.

A plurality of VNF entities 140 in a same network slice instance 160 may be independent of each other (as shown in FIG. 1), one or more VNF entities 140 in a same network slice instance 160 may jointly own one VNF service framework 180 (as shown in FIG. 2), and one network slice instance 160 may include one or more VNF service frameworks 180. In an architecture shown in FIG. 2, a service-oriented architecture is used for a virtual network function, and network functions are integrated on a VNF service framework in a form of a VNF service. To be specific, as shown in FIG. 2 and FIG. 3, each VNF entity 140 includes one or more network function service instances 190 and a VNF service framework 180 providing support for running of the one or more network function service instances 190. The VNF service framework 180 provides universal computation invocation, storage access, network access, and hardware acceleration capabilities for a service-oriented VNF. Network configuration of a deployed network function instance is performed on the VNF service framework 180, and service configuration of the deployed network function instance is transferred to the network function service instance 190 by using the VNF service framework 180. VNF service frameworks 180 are controlled by the NSCF entity 130 in a unified manner. A plurality of network function service instances 190 may further simultaneously run on a VNF service framework 180 deployed on a virtualized or cloudified infrastructure 170 at a location. For example, a UPF and an app at a mobile edge computing (MEC) location share one VNF service framework. For ease of description, the VNF entity 140, the PNF entity 150, or the network function service instance 180 running on the VNF service framework 180 may also be referred to as a network function entity.

The network function entity may bear some network and service functions. Specifically, the network function entity may be a user plane function entity and/or a control plane function entity. However, this is not limited in this embodiment of the present invention. For example, the network and service function borne by the network function entity may be specifically an access management function (AMF), a session management function (SMF), a policy control function (PCF), a user plane function (UPF), or an application server (APP).

The NSMF entity 110 may be configured to manage a life cycle of the network slice instance 160. For example, the NSMF entity 110 manages a creation process, an activation process, a running process, a deactivation process, a deletion process, or another process of the network slice instance 160. In this embodiment of the present invention, a management operation of the NSMF entity 110 in the process of creating the network slice instance 160 is mainly described. For example, the NSMF entity 110 receives a network slice order of a customer, and drives, based on a stored network slice template, the orchestration entity 120 and the NSCF entity 130 to create the network slice instance 160, to complete resource deployment and service configuration of the network slice instance 160. The network slice template herein is a template that is used by the NSMF entity 110 to create the network slice instance 160 and that is pre-designed for a type of service. The network slice template includes a workflow, a deployment template, and a model and a policy of a network slice. The orchestration entity 120 may be an NFV-MANO entity, or may be a management and orchestration entity of a PasS cloud platform. The orchestration entity 120 may be, based on the workflow in the network slice template, responsible for allocating a resource that is of the infrastructure 170 and that is required by the network slice instance 160, completes deployment of a VNF entity 140 on the virtualized or cloudified infrastructure 170, and completes a network connection to another VNF entity 140 or a PNF entity 150. The NSCF entity 130 automatically generates a network slice service configuration scheme based on the model and the policy of the network slice in the network slice template, a plan and a service-related requirement parameter in the network slice order, and registration information of each network function entity, and delivers the network slice service configuration scheme to a corresponding network function entity (including the VNF entity 140 and/or the PNF entity 150) in the network slice instance 160, to complete service configuration of the network slice. The PNF entity 150 may be a physical device that is specially used for a communications network and that is built and deployed by an operator in advance. The virtualized or cloudified infrastructure 170 may be a universal physical device deployed by the operator or a cloud service provider in advance, and provides computing, memory, storage, and network resources. The orchestration entity 120 controls the virtualized or cloudified infrastructure 170 to use the foregoing resources to deploy a VNF instance. The virtualized or cloudified infrastructure 170 may also be briefly referred to as an infrastructure 170.

The model of the network slice also is a model required for automatically generating a service configuration, and may be briefly referred to as a model. The model includes one or more of the following types: a resource model, a network model, and a service model. The network model is used to indicate network function entities required by each service in a network slice instance and a logical connection relationship between the network function entities. For example, network function entities such as a UPF, an SMF, and an eNodeB need to be deployed for an IoT service, the UPF is connected to the radio eNodeB by using a service network, and the UPF is connected to the SMF by using a signaling network. The resource model is used to indicate a correspondence between a service scale and a resource quantity and a correspondence between the service scale and a network bandwidth magnitude. To be specific, the resource model is used to describe a quantity of resources occupied by a network function entity under different service scales and magnitudes of network bandwidths that need to be occupied under different service scales. For example, when each UPF instance supports 500,000 sessions, a 4-core CPU, 16 G memory, and a 200 G hard disk are required, and a service network interface of the UPF requires a bandwidth of 10 Gbps. For another example, a specific example of the resource model describes a quantity of infrastructure resources occupied by an AMF, an SMF, a PCF, a UPF or an app in a specific service. The service model is used to indicate service configuration of a network function entity and a related coordination relationship between network function entities in terms of service configuration. For example, a related coordination relationship between an AMF, an SMF, a PCF, a UPF, and an app in terms of service configuration is as follows: Service configuration of the AMF needs to be capable of supporting the AMF in sending service request signaling of the network slice instance to the SMF, and the SMF can find a suitable UPF to establish a user plane session connection for a user. For another example, a UPF entity needs to configure a signaling connection address of an SMF entity responsible for managing session establishment. When the UPF entity functions normally, the UPF entity initiates a signaling connection to the SMF entity.

The policy of the network slice also is a policy required for automatically generating a service configuration, and may be briefly referred to as a policy. The policy includes one or more of the following types: a network policy, a resource policy, and a service policy. Generally, the policy includes a trigger event or an occasion (briefly referred to as an event below) for performing an operation scheme, a condition (briefly referred to as a condition below) for performing an action, and specific content of the action. The condition may be from a relationship included in the model, or may be policy-customized.

The network policy includes location requirement rules of network function entities in a network slice instance and a performance requirement rule of a network bandwidth and a latency between the network function entities. For example, a UPF (namely, an LBO UPF) responsible for a local breakout and an app need to be configured at a same site, to avoid roundabout user plane transmission and meet a relatively strict latency requirement. A network policy in this example may be specifically as follows: When a workflow proceeds to configuring LBO (local breakout function) for the UPF, it is determined which one of all UPFs that have already been deployed meets a condition of being at a same site as the app, and an action to be performed for a UPF that meets the condition is enabling a function of configuring the LBO function for the UPF.

The resource policy includes a resource occupation rule of a network function entity and a bandwidth use rule of a link of a physical network entity. For example, it is ensured that a total link bandwidth of all network function entities on a MEC does not exceed an egress network bandwidth of a data center. A resource policy in this example is specifically as follows: When a workflow proceeds to configuring a network egress bandwidth limit for a UPF entity deployed on the MEC, it is determined whether a sum of network egress bandwidths that have already been allocated to the UPF in the current MEC exceeds 100 G If the sum already exceeds 100 G, a to-be-performed action is selecting a UPF on another MEC for configuration. If the sum does not exceed 100 G, a to-be-performed action is allowing configuration of a network egress for the UPF, and an allowable maximum bandwidth is limited to a difference obtained by subtracting the sum of the configured bandwidths from 100 G.

The service policy includes a rule of determining, based on the plan of the network slice and registration information of a network function entity, how to perform service configuration for the network function entity. For example, a UPF on a MEC enables an LBO (local breakout) function and a flow identification function, a service data flow is sent to an anchor UPF after the LBO and an app are connected in series, and a flow identification rule and an app serial-connection rule are configured in a PCF. A service policy in this example is specifically as follows: When a workflow proceeds to enabling LBO function configuration for the UPF, it is determined whether an LBO service of the UPF needs to be deployed in an app of the current MEC for processing. If a determining result is that the LBO service needs to be deployed in the app of the current MEC, to-be-performed actions include the following: (1) The UPF configures the flow identification function; (2) the corresponding flow identification rule is configured in the PCF; and (3) a service flow rule configured in the PCF further specifies that a user session data packet is processed by the app and is then sent by the UPF to the anchor UPF function entity.

All the policies may be described in the following form: When a step in the workflow is performed, it is determined whether specific content or a specific value of the foregoing basic attribute currently meets one or more conditions, and a corresponding operation scheme is performed based on whether the conditions are met. The operation scheme is one or more actions that are automatically generated based on the model and specific information of a currently created network slice when the specific content or the specific value of the foregoing basic attribute meets the condition described in the policy. In this way, the operation scheme meets the rule described in the foregoing policy. The policy is stored in an easy-to-manage and easy-to-adjust manner, for example, by using an XML description event, a condition or a condition set, and a to-be-performed operation scheme. The model may be described and stored in a manner that complies with the TOSCA standard specification.

The deployment template is determined during network slice design. The deployment template includes a description of a functional requirement of a service that can be supported by a network slice instance created by using the deployment template, and a description of a non-functional requirement such as performance and reliability. For example, the description of the functional requirement includes an optional service function; the performance includes a latency, a service capacity, and a bandwidth of a single connection; and the reliability may be a time for recovery from a fault.

The workflow includes abstract and general descriptions of a working procedure of deploying a network slice instance and a service rule between operating steps of the workflow. The workflow specifically includes abstract and general descriptions of the following working procedure: obtaining and parsing an order; obtaining a service-related requirement parameter and a plan of a network slice that are included in the order; sending the service-related requirement parameter, the plan of the network slice, and a deployment template to the orchestration entity 120, to perform NFV deployment; and sending the service-related requirement parameter of the network slice and a model, a policy and the plan of the network slice to the NSCF entity 130, to perform service configuration.

The plan of the network slice may include a connection plan of a network slice instance and an adjacent network, a plan of an IP address of the network slice instance, or the like. The service-related requirement parameter may include performance and reliability requirements of a network slice instance. For example, a self driving service that is of the internet of vehicles and that is provided by the network slice instance is used as an example. The service-related requirement parameter includes the following: A network slice capacity indicates how many vehicles can be connected, a latency is less than 10 milliseconds, and a bandwidth of a single connection is 100 megabytes. The connection plan of the network slice instance and the adjacent network is a connection between the adjacent network and a control server of the internet of vehicles. For another example, the plan of the network slice specifically includes that the network slice instance supports a topological connection between 100,000 users and a radio access network, and includes a control plane IP address plan, a user plane IP address plan, an IP address plan of an app, and the like.

The foregoing communications system 100 may further include a database (not shown in the figure). The database stores the model, the policy, and the plan of the network slice. The database may further store registration information of a VNF, a PNF, or a VNF service framework. The database may be integrated into the NSCF 130 or another network element such as the NSMF 110 in the communications system 100. The database may alternatively exist as an independent network element. The database may be a centralized database or a distributed database. A quantity of databases is not limited, and there may be one or more databases. If the communications system 100 includes a plurality of databases, different information may be stored into different databases. For example, resource information and a network location are stored into a resource database, and a connection topology is stored into a topology database.

The solution relates to a system for creating a network slice. In this way, resource deployment can be automatically completed on the virtualized or cloudified infrastructure 170 based on a pre-designed network slice template and a plan of a network slice in a network slice order, and network connection can be performed for a virtual network function and a physical network function. Then, a network slice service configuration scheme (which may include a service-related network configuration based on a service requirement) is automatically generated, and is performed on the virtual network function and the physical network function, to implement automation of a network slice creation process. According to the system and the method in the present invention, a network slice instance can be automatically created. The network slice instance is a logically-isolated end-to-end network slice instance that is generated by the foregoing system in a physical network of the network virtualized or cloudified infrastructure 170 based on the network slice template through instantiated orchestration, and service configuration is performed, so that a network service in the order can be provided for a customer.

Figure 4A:
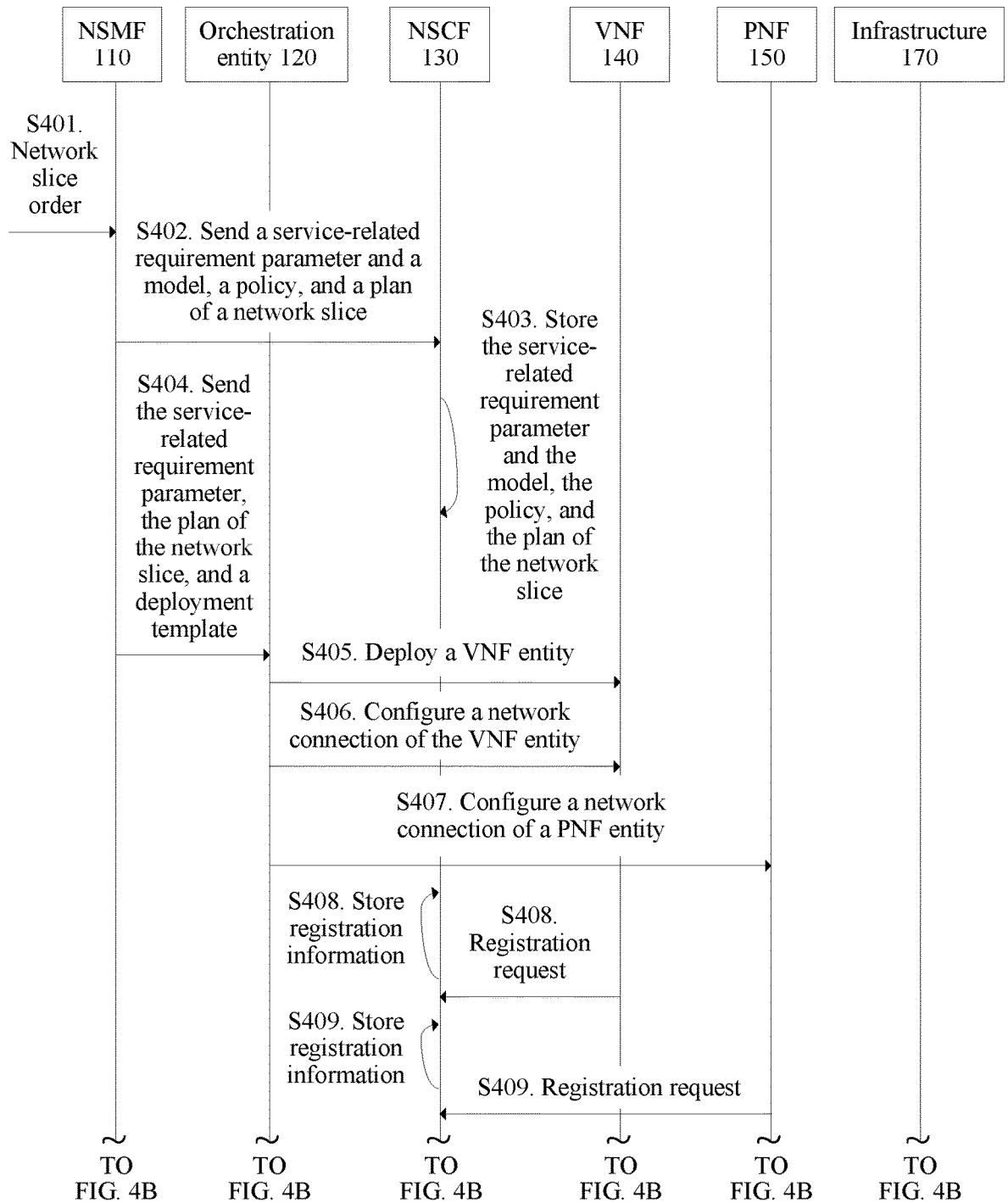
FIG. 4A and FIG. 4B are a schematic flowchart of a method for creating a network slice according to an embodiment of the present invention.
Figure 4B:
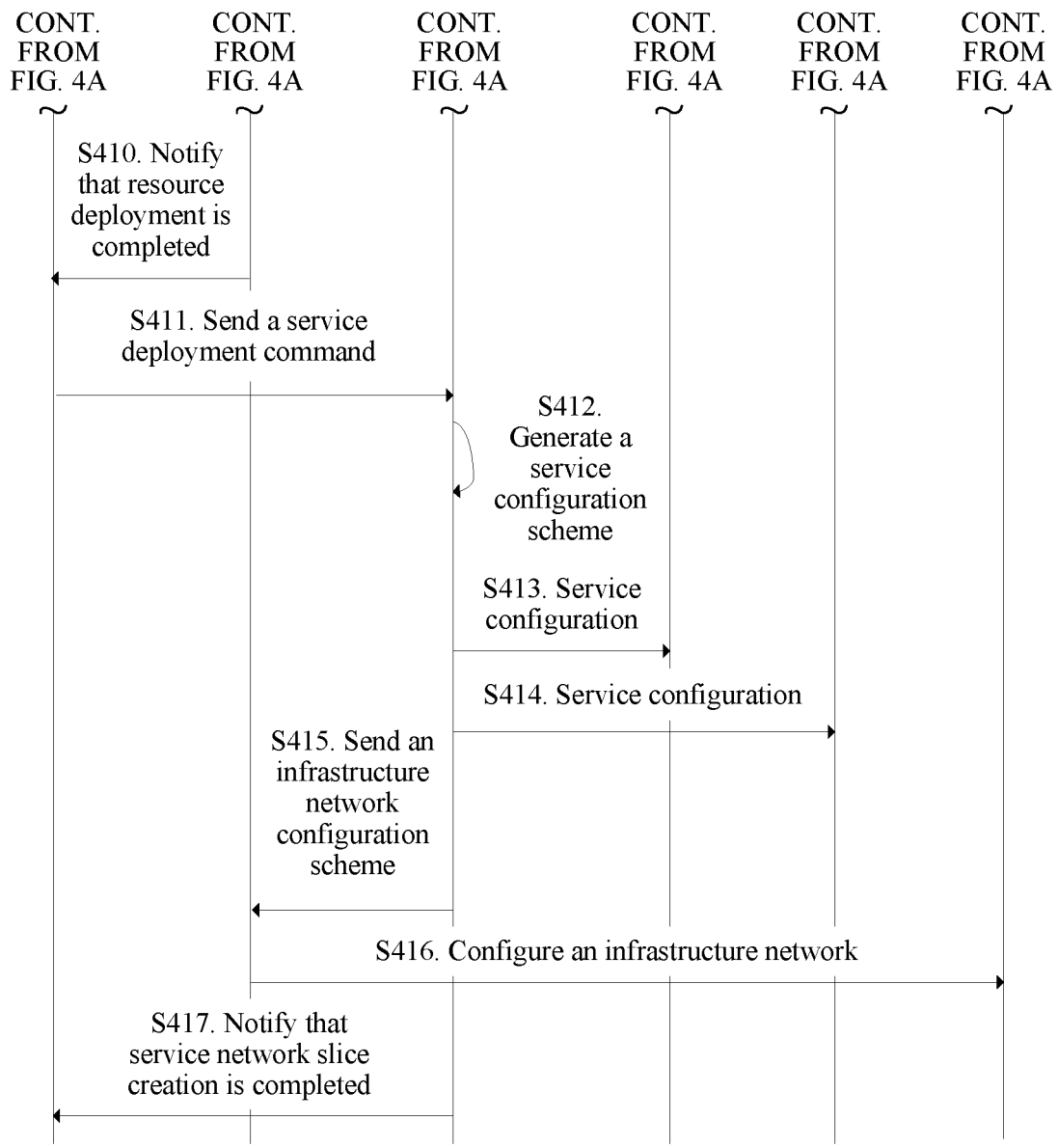
Figure 5A:
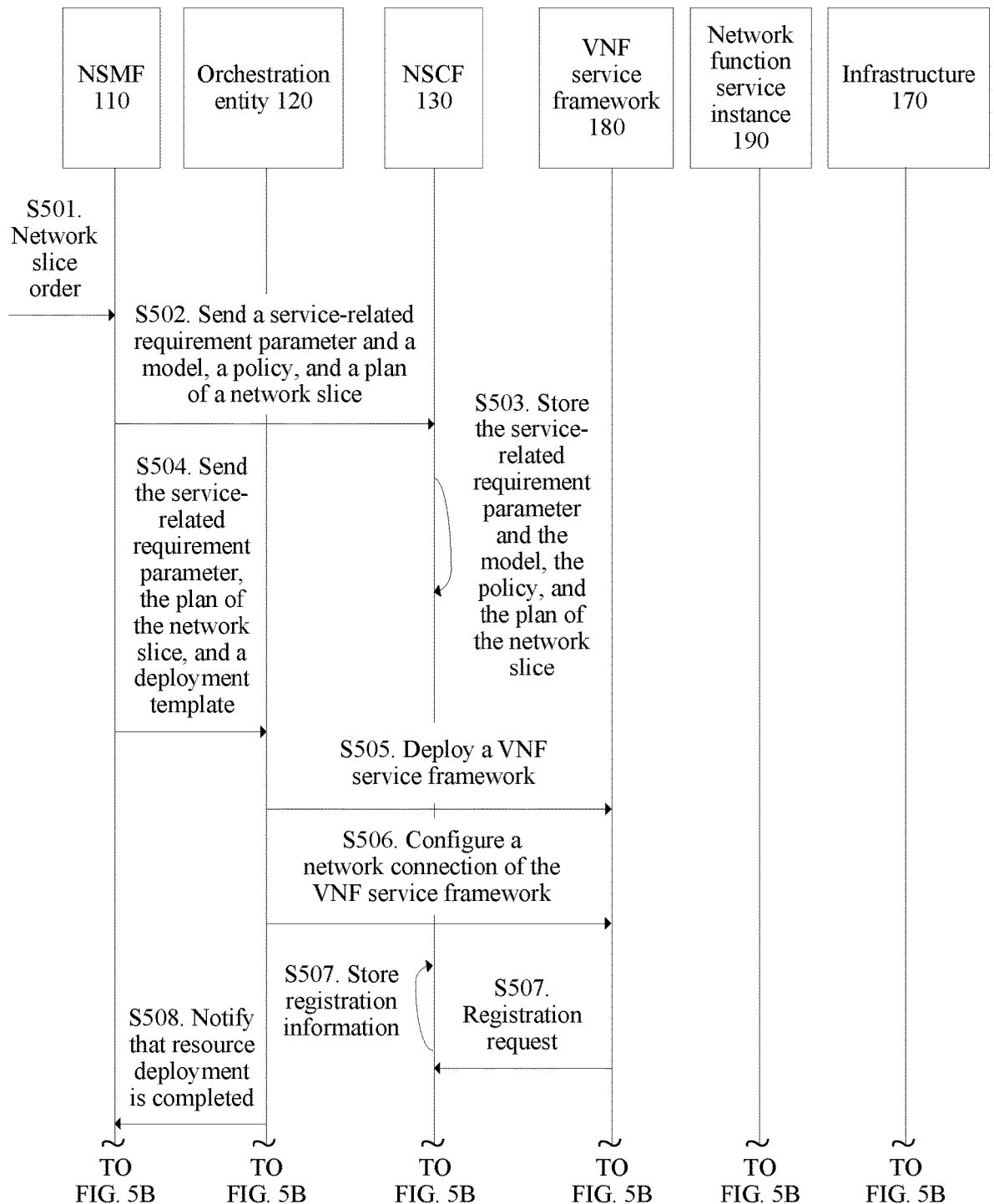
FIG. 5A and FIG. 5B are a schematic flowchart of another method for creating a network slice according to an embodiment of the present invention.
Figure 5B:
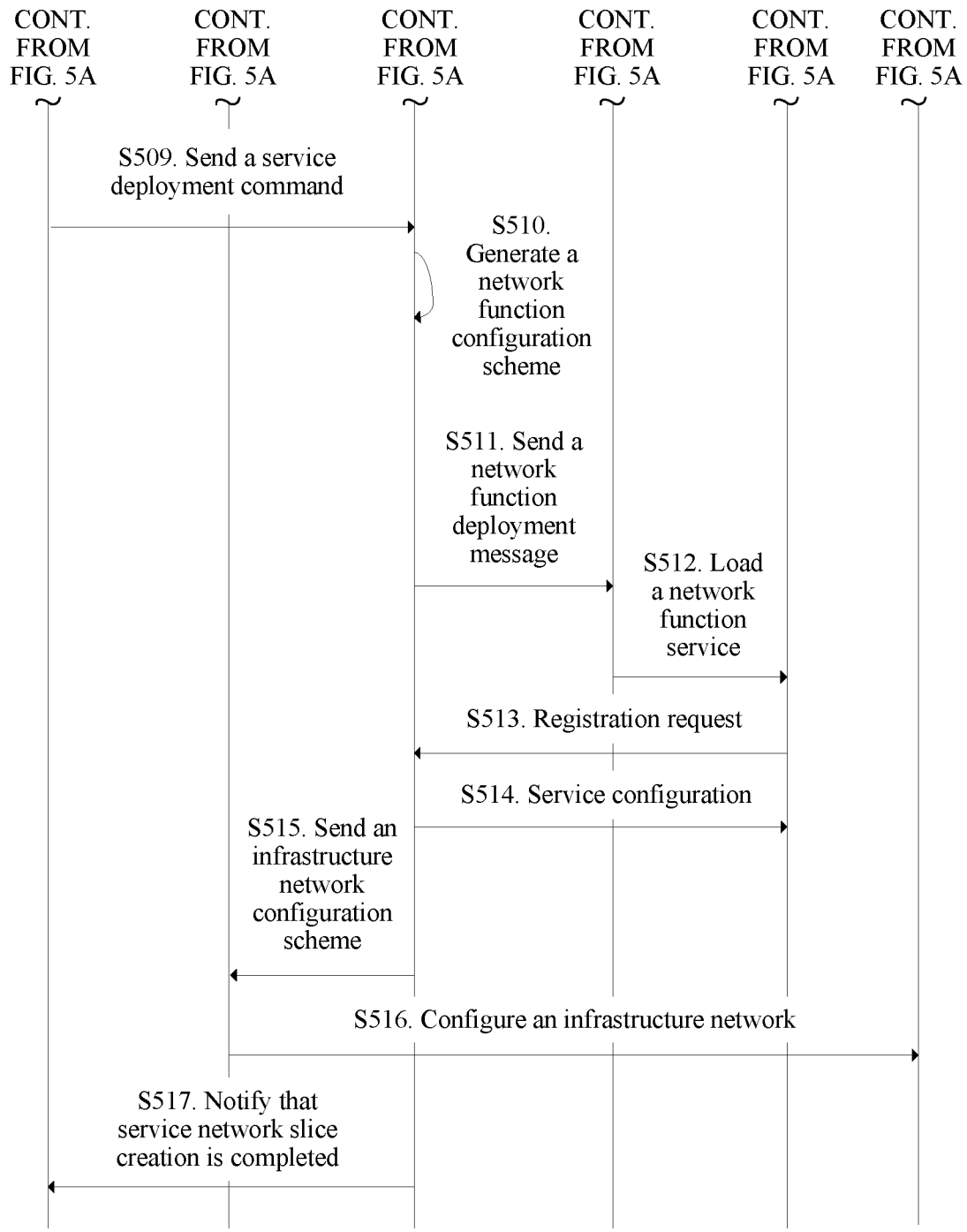

FIG. 4A and FIG. 4B show a method for creating a network slice according to an embodiment of the present invention. The method may be applied to the foregoing communications system, and the method includes the following steps.

S401. An NSMF entity 110 receives a network slice order of a customer from a business support system, where the network slice order includes an index of a network slice template, a plan of a network slice, and a service-related requirement parameter. The plan of the network slice, the service-related requirement parameter, and a reliability requirement have already been described in the embodiments related to FIG. 1 to FIG. 3. Details are not described herein again.

Prior to this step, an operator may pre-design a series of slice templates, and may generate a customized product for each slice template. The operator may further release the customized product by using the business support system. When the customer subscribes to the customized product by using the business support system, the customer obtains the network slice order. The NSMF entity 110 further stores a correspondence between an index of a network slice template and a network slice template. The NSMF entity 110 may obtain the index of the network slice template from the network slice order, and then obtain the network slice template based on the stored correspondence between an index of a network slice template and a network slice template. The index of the network slice template herein is an identifier that may include a series of numbers or letters.

The NSMF entity 110 may obtain a model, a policy, a workflow, and a deployment template from the network slice template. The NSMF entity 110 obtains detailed content of the network slice order through parsing based on the workflow, and obtains the service-related requirement parameter and the plan of the network slice that are included in the network slice order. The model, the policy, and the workflow herein have already been described in the previous part. Details are not described herein again.

S402. The NSMF entity 110 sends the service-related requirement parameter of the network slice and a model, a policy, and the plan of the network slice to an NSCF entity 130.

S403. The NSCF entity 130 receives and stores the service-related requirement parameter, the model, the policy, and the plan of the network slice that are sent by the NSMF entity 110.

The NSCF entity 130 may store the service-related requirement parameter, the model, the policy, and the plan of the network slice into the NSCF entity 130, or may store the service-related requirement parameter, the model, the policy, and the plan of the network slice into a database.

S404. The NSMF entity 110 sends the service-related requirement parameter, the plan of the network slice, and a deployment template to an orchestration entity 120.

There may be no sequence between S404 and S402.

S405. The orchestration entity 120 receives the service-related requirement parameter, the plan of the network slice, and the deployment template, fills the service-related requirement parameter and the plan of the network slice in the deployment template to generate an NFV-NSD file, and deploys a VNF entity 140 on a virtualized or cloudified infrastructure 170 based on the NFV-NSD file.

The NFV-NSD file further includes a description file of the VNF entity that needs to be deployed. The description file of the VNF entity includes a quantity of VNF entities that bear each type of network function entity, and quantities and requirements of CPUs, memory, disks, and network interfaces allocated to the VNF entity. The orchestration entity 120 deploys a corresponding quantity of VNF entities on the virtualized or cloudified infrastructure based on the description file of the VNF entity. The NFV-NSD file further includes a description about network planes to which all types of network interfaces of each type of VNF entity are connected. The orchestration entity 120 connects network interfaces of each deployed VNF entity to all network planes based on the description, to implement a network connection between VNF entities and a network connection between a VNF entity and a PNF entity. That the PNF is manually physically deployed in advance and is manually connected to a planned network plane in advance has been fixedly described in the deployment template. The fixed description in the deployment template is directly used in the automatically generated NFV-NSD file.

S406. The orchestration entity 120 configures, based on the NFV-NSD file, a network connection for a VNF entity 140 that has been successfully created.

The orchestration entity 120 further implements a network connection between the VNF entity 140 and another VNF entity and a network connection between the VNF entity 140 and a PNF entity. It should be noted that, the VNF entity 140 and each of the another VNF entity and the PNF entity herein may belong to the network slice instance, or may belong to different network slice instances.

The orchestration entity 120 may further allocate an IP address to the VNF entity 140, and send, to the VNF entity 140, an IP address of an NSCF entity 130 corresponding to the VNF entity 140.

S407. If the NFV-NSD file further includes a workflow of deploying a PNF entity 150 in a network slice instance, the orchestration entity 120 further configures a network connection between the VNF entity 140 and the PNF entity 150 based on the NFV-NSD file.

The orchestration entity 120 further implements a network connection between the PNF entity 150 and another PNF entity and a network connection between the PNF entity 150 and a VNF entity. It should be noted that, the PNF entity 150 and each of the another VNF entity and the PNF entity herein may belong to a same network slice instance, or may belong to different network slice instances.

The orchestration entity 120 may further allocate an IP address to the PNF entity 150, and send, to the PNF entity 150, an IP address of an NSCF entity 130 corresponding to the PNF entity 150.

S408. The VNF entity 140 sends, to the NSCF entity 130 based on a received IP address of the NSCF entity 130, a registration request that includes registration information, where the registration information includes resource information, a network location, and a connection topology of the VNF entity 140.

The NSCF entity 130 receives the registration request, and stores the registration information into the database. Specifically, the resource information may be a virtual machine resource (including a CPU, memory, and a disk) occupied by the VNF entity 140 and an allocated network interface bandwidth. The network location is location information of a data center in which the VNF entity 140 is located. The connection topology may be the IP address of the VNF entity 140 and a connection relationship between the VNF entity 140 and each of the another VNF entity and the PNF entity.

S409. If the network slice instance further includes the PNF entity 150, the PNF entity 150 may further send, to the NSCF entity 130 based on a received IP address of the NSCF entity 130, a registration request that includes registration information, where the registration information includes a network location and a connection topology of the PNF entity 150.

The NSCF entity 130 receives the registration request, and stores the registration information into the database. Specifically, the network location is location information of a data center in which the PNF entity 150 is located. The connection topology may be the IP address of the PNF entity 150 and a connection relationship between the PNF entity 150 and each of the another VNF entity and the PNF entity.

S410. The orchestration entity 120 notifies, based on content of the NFV-NSD file, the NSMF entity 110 that resource deployment is completed. This step is performed after S407 is completed, and may be processed in parallel with S408 or S409.

S411. After receiving the notification indicating that resource deployment is completed, the NSMF entity 110 sends a service deployment command to the NSCF entity 130.

S412. After receiving the service deployment command, the NSCF entity 130 generates a network slice service configuration scheme based on the service-related requirement parameter, the model, the policy, the plan, and registration information of a network function entity (including the VNF 140 and/or the PNF 150). A specific method is as follows.

The NSCF entity 130 determines a service configuration relationship between network function entities based on the model, the policy, the plan, and the registration information of the network function entity; inputs the plan of the network slice and the service-related requirement parameter into the service configuration relationship between network function entities based on the policy, the service-related requirement parameter, and the plan, so that the service configuration relationship meets a rule specified by the policy of the network slice; and generates a specific service configuration scheme of each network function entity.

The model of the network slice includes a network model, a resource model and a service model, the policy includes a network policy, a resource policy, and a service policy, and these models and policies are universal for each time of network slice instance creation. In this way, the NSCF entity 130 may obtain a universal model and policy. Then, the NSCF entity 130 may generate, based on a connection plan of the network slice instance created this time and an adjacent network and a plan of an IP address of the network slice instance, performance and reliability requirements of the network slice instance that are included in the service-related requirement parameter, and the registration information of the network function entity deployed in the network slice instance created this time, a specific service configuration scheme for each network function entity included in the network slice instance created this time, where the connection plan of the network slice instance created this time and the adjacent network and the plan of the IP address of the network slice instance are included in the plan. In addition, content included in the model is a relatively stable abstract description, and content included in the policy is an operation rule that is easy to modify and adjust. If necessary, a default policy in a network slice is allowed to be appropriately modified before the slice is created.

The NSCF entity 130 obtains, from the plan of the network slice, the service-related requirement parameter, and the registration information, related information required by a condition and an action that are included in the policy; determines whether the related information meets a condition included in the network policy; determines a to-be-performed action based on a determining result and the foregoing related information; and finally generates a specific operation scheme. According to the operation scheme, corresponding parameters, in the model and obtained from the plan of the network slice, the service-related requirement parameter, and the registration information of the network function entity, comply with a configuration relationship described in a corresponding model, and the specific operation scheme that is finally generated meets a corresponding policy.

To be specific, the NSCF entity 130 determines, based on the network model and one or more of the service-related requirement parameter, the registration information of the network function entity, and the plan of the network slice, a network configuration relationship between network function entities that have been deployed, so that the network policy is met; determines, based on the service model, the network configuration relationship, and one or more of the service-related requirement parameter, the registration information of the network function entity, and the plan of the network slice, a service configuration relationship between the network function entities that have been deployed, so that the service policy is met; determines, based on the resource model and one or more of the service-related requirement parameter, the registration information of the network function entity, and the plan of the network slice, a resource configuration relationship between the network function entities that have been deployed, so that the resource policy is met; and obtains a specific service deployment configuration scheme of each of the network function entities.

S413. The NSCF entity 130 sends, to the VNF entity 140, a service configuration message that includes the service configuration scheme, and the VNF entity 140 completes corresponding service configuration based on the service configuration scheme.

If the network slice instance includes a plurality of VNF entities 140, the NSCF entity 130 may send one or more service configuration messages. Service configuration messages sent to different VNF entities 140 may be the same or different. If the service configuration messages are the same, the service configuration message may include service configuration schemes of the plurality of VNF entities 140 of the network slice instance, or the service configuration message may include service configuration schemes of the plurality of VNF entities 140 and one or more PNFs 150 of the network slice instance. If the service configuration messages are different, the service configuration message may include only the service configuration scheme of the VNF entity 140.

S414. The NSCF entity 130 sends, to the PNF entity 150, a service configuration message that includes the service configuration scheme, and the PNF entity 150 completes corresponding service configuration based on the service configuration scheme. The process is similar to that in S413. There is no sequence between S413 and S414.

S415. If a service-related infrastructure network configuration scheme needs to be performed on the virtualized or cloudified infrastructure 170 of the VNF entity 140, the NSCF entity 130 may further generate a related infrastructure network configuration scheme in S411, and send the infrastructure network configuration scheme to the orchestration entity 120. The infrastructure network configuration scheme includes switched-network configuration, route configuration, and a virtual interface configuration of the virtualized or cloudified infrastructure 170.

There is no sequence between S415 and each of S413 and S414, and the three steps may alternatively be performed simultaneously.

S416. The orchestration entity 120 receives configuration information sent by the NSCF entity 130, and after receiving a command in S415, the orchestration entity 120 performs service-related network configuration for the infrastructure 170 of the VNF entity 140, for example, configures an IP route between a virtual network interface of the VNF and a service processing interface of the VNF.

S417. After completing all service configuration, the NSCF entity 130 sends, to the NSMF entity 110, a notification indicating that network slice creation is completed.

In this solution, a network slice control function entity may automatically generate a corresponding network slice service configuration scheme based on a pre-designed model and policy of a network slice, a plan of the network slice in an order, and resource deployment information, so that a slice can be automatically and flexibly created at different sites. In the prior art, each time before a network slice instance is created, a service configuration scheme needs to be manually modified and adjusted in advance based on an order requirement to create a network slice. However, in this solution, the network slice control function entity can automatically generate a service configuration scheme of a to-be-deployed network slice instance, and automatically creates a network slice, without manually modifying and adjusting the service configuration scheme.

With reference to the system architecture in FIG. 2, the following further describes an example of a network slice instance creation process provided in the embodiments of the present invention.

S501 to S504 are the same as S401 to S404.

S505. The orchestration entity 120 deploys a VNF service framework 180 on a virtualized or cloudified infrastructure 170 based on an NFV-NSD file.

S506. The orchestration entity 120 instructs, based on the NFV-NSD file, a successfully created VNF service framework 180 to configure a network connection.

The orchestration entity 120 may implement a network connection between the VNF service framework 180 and another VNF service framework and a network connection between the VNF service framework 180 and a PNF entity. It should be noted that, the VNF service framework 180 and each of the another VNF service framework and the PNF entity herein may belong to the network slice instance, or may belong to different network slice instances.

The orchestration entity 120 may further allocate an IP address to the VNF service framework 180, and send, to the VNF service framework 180, an IP address of an NSCF entity 130 to which the VNF service framework 180 needs to be connected.

S507. The VNF service framework 180 sends, to the NSCF entity 130 based on an IP address of the NSCF entity, a registration request that includes registration information, where the registration information includes resource information, a network location, and a connection topology of the VNF service framework 180.

The NSCF entity 130 receives the registration request, and stores the registration information into the database. Specifically, the resource information may be a virtual machine resource (including a CPU, memory, and a disk) occupied by the VNF service framework 180 and an allocated network interface bandwidth. The network location is location information of a data center in which the VNF service framework 180 is located. The connection topology may be the IP address of the VNF service framework 180 and a connection relationship between the VNF service framework 180 and each of the another VNF service framework and the PNF entity.

S508. The orchestration entity 120 notifies the NSMF entity 110 that resource deployment is completed. This step is performed after S505 is completed, and may be processed in parallel with S506.

S509. After receiving the notification indicating that resource deployment is completed, the NSMF entity 110 sends a service deployment command to the NSCF entity 130.

S510. After the NSCF entity 130 receives the service deployment command, the NSCF entity obtains, from a network model, network function services that need to be deployed for a network slice and a connection relationship between the network function services; then, the NSCF may calculate, based on the service-related requirement parameter and a resource model, a quantity of service instances that need to be configured for each network function service and a network connection bandwidth required between the service instances; and next, the NSCF entity further calculates, based on data such as an available resource and a network connection topology that are obtained from the registration information of the VNF service framework, a network function configuration scheme that complies with a resource policy, that is, determines which network function service instance is deployed on which VNF service framework, determines an available resource of the VNF service framework, and determines that a network connection between VNF service frameworks can support such a deployment.

In other words, the NSCF entity 130 generates a network function service configuration scheme based on the service-related requirement parameter, the model, the policy, and the plan of the network slice, and the registration information of the VNF service framework 180. The network service configuration scheme includes a type of a network function service that needs to be deployed on each VNF service framework 180, and a quantity of network function service instances of each type. The network service configuration scheme may further include an address of a software image of each type of network function service.

If the VNF-NSD file may further include the address of the software image of each type of network function service, when the VNF service framework is deployed, the orchestration entity 120 may send the address of the software image of each type of network function service to the VNF service framework. In this case, the network service configuration scheme may not include the address of the software image of each type of network function service.

The NSCF entity 130 determines which network function service instance 190 is deployed on which VNF service framework 180. For example, the NSCF entity 130 calculates a quantity of required network function services and a quantity of to-be-deployed instances based on the service-related requirement parameter, the resource model, and the plan; and then determines, according to the resource policy of the network slice based on an available resource of each VNF service framework 180 and a connection topology between the VNF service frameworks 180, a network function service instance 190 that needs to be deployed on each VNF service framework 180. A network function service type may include a service type such as mobility management or session management, for example, an AMF, an SMF, a PCF, a UPF, or an app.

S511. The NSCF entity 130 sends, to the VNF service framework 180, a network function service deployment message that includes a network function service configuration scheme.

S512. The VNF service framework 180 receives the network function service deployment message, and the VNF service framework 180 installs, based on an address of a software image of a network function, a software image of the network function service that needs to be deployed, and loads the network function service that needs to be deployed, so that a network function service instance runs on the VNF service framework 180.

If there are a plurality of VNF service frameworks 180, each VNF service framework 180 deploys a corresponding network function service based on the network function service deployment message and the foregoing process.

S513. After running, a network function service instance 190 may initiate a network function registration request to the NSCF entity 130 based on the IP address that is of the NSCF entity 130 and that is provided by the VNF service framework 180.

Optionally, the network function service instance 190 may alternatively initiate network function registration to the NSCF entity 130 after the VNF service framework 160 monitors running of the network function service instance.

S514. The NSCF entity 130 sends, to the running network function service instance 190, a service configuration message that includes a service configuration scheme, and the running network function service instance 190 completes corresponding service configuration based on the service configuration scheme.

A process in which the NSCF entity 130 determines the service configuration scheme is as follows.

The NSCF entity 130 obtains, from the plan of the network slice, the service-related requirement parameter, and the registration information, related information required by a condition and an action that are included in the network policy; determines whether the related information meets the condition included in the network policy; determines a to-be-performed action based on a determining result and the foregoing related information; and finally generates a specific operation scheme. The operation scheme is used to configure a network connection and a connection bandwidth between network function services, so that corresponding parameters, in the network model and obtained from the plan of the network slice, the service-related requirement parameter, and the registration information, comply with a network configuration relationship described in the corresponding network model, and the specific operation scheme that is finally generated meets a corresponding network policy.

The NSCF entity 130 obtains, from the plan of the network slice, the service-related requirement parameter, and the registration information, related information required by a condition and an action that are included in the service policy; determines whether the related information meets the condition included in the service policy; determines a to-be-performed action based on a determining result and the foregoing related information; and finally generates a specific operation scheme. The operation scheme is a service configuration between network function entities for which network function service instances have been deployed on the VNF service framework, so that corresponding parameters, in the service model and obtained from the plan of the network slice, the service-related requirement parameter, and the registration information, comply with a service configuration relationship described in the corresponding service model, and the specific operation scheme that is finally generated meets a corresponding network policy.

S515 to S517 are the same as steps S415 to S417.

For example, for a service chain between a UPF and an app on a MEC, the NSCF entity 130 needs to complete, by using the orchestration entity 120, corresponding network configuration on a virtual switch implemented on the virtualized or cloudified infrastructure 170.

In this embodiment, a PNF entity 150 may alternatively be configured in a network slice instance, and the process is the same as the processes of S409 and S412.

In this embodiment, a network slice control function entity automatically controls service configuration of a network slice, and may further control deployment and a connection topology of a virtual network function based on a policy. In this way, a deployment location and a connection topology of each virtual network function can be flexibly adjusted based on information about a plan of the network slice, so that an automatically generated service configuration of the network slice can better match resource deployment, and can better adapt to a service distribution difference of the network slice at different locations.

The following continues to use a specific example to describe a network slice creation process in the embodiments of the present invention.

An enterprise subscribes to a network slice of an operator for a mobile office, and requires the operator to configure a data network name (DNN) named "ABC" to be connected to a mobile office server of the enterprise. An address of the mobile office server of the enterprise is AA:BB::CC. The enterprise specifies the following service-related requirement parameters in a network slice subscription order: 1.

slice service scope: a city A; 2. service capacity requirement: a connection bandwidth of 300 Mbps; 3. DNN name: "ABC"; 4. connection address: AA:BB::CC; and 5. optional function: enabling anti-attack filtering.

The operator is capable of providing the network slice. The operator may make a plan for the network slice. Content of the plan is as follows: An available service address pool of the city A is AA:BB::1 to 100, where an internal network address of a DC-A egress router Router-A is CC:DD::111, and an external network address of the router is AA:BB::101; and an available service address pool of a city B is AA:BB::501 to 600, where an internal network address of a DC-B egress router Router-B is EE:FF::111, and an external network address of the router is AA:BB::601.

When an NSMF entity receives the network slice order, the NSMF entity may obtain the plan of the network slice, the service-related requirement parameter, and an index of a network slice template from the network slice order. The NSMF entity may obtain the network slice template based on the index of the network slice template; obtain a deployment template and a workflow; send the service-related requirement parameter, the deployment template, and the network plan to an orchestration entity according to a stipulation of the workflow; and send the related requirement parameter and a model, a policy, and the plan of the network slice to an NSCF entity.

A resource model herein describes that each service address supports maximum traffic of 500 Mbps. A network model includes the following content: (1) Each service address needs to be configured for all service processing virtual machines of a virtual mobile gateway; (2) the address of the connected mobile office server of the enterprise is within a range specified by a "connection address" field in the service requirement parameter, and a route from each service address to the connection address through an interface address is configured; and (3) a router in a data center configures a route to each service address through each interface address. A service model describes the following information: (1) configuring, on the virtual mobile gateway, the DNN specified in the order; (2) associating, on the virtual mobile gateway, the route from the service address to the connection address with the DNN specified in the order; and (3) enabling, for the DNN, the optional function specified in the order.

A resource policy herein includes the following content: an occasion (which may also be referred to as a trigger event of executing the resource policy) of executing the resource policy: during service address configuration; a condition of executing the resource policy: determining whether a value of the "service capacity requirement" field that is in the order and that is equal to a connection bandwidth configured by the virtual mobile gateway for the mobile office server of the enterprise is greater than the maximum service traffic supported by each service address in the model; and an operation scheme of executing the resource policy: if the value of the "service capacity requirement" field is not greater than the maximum service traffic supported by each service address in the model, two unallocated service addresses are obtained from IP addresses included in the plan; otherwise, service addresses of a quantity (the service capacity requirement/maximum traffic of a single service IP address in the resource model+2) are allocated.

A network policy includes the following content: an occasion (which may also be referred to as a trigger event of executing the network policy) of executing the network policy: after service address configuration is completed; a condition of executing the network policy: whether the plan of the network slice includes a data center router in a same network segment as the service address; and an operation scheme of executing the network policy: if the plan of the network slice includes a data center router in a same network segment as the service address, an interface IP address is obtained from each virtual machine after NFV deployment, an egress route of service traffic is configured for each allocated service address based on the description (2) of the network model, a router of a data center in which NFV deployment is performed is obtained from the plan of the network slice, and an ingress route of service traffic is configured for each allocated service address based on the description (3) of the network model; or if the plan of the network slice includes no data center router in a same network segment as the service address, an attempt is made to reallocate the service address.

A service policy includes the following content: an occasion of executing the service policy: when service configuration of a network function is performed; a condition 1 of executing the service policy: whether the network slice order includes a DNN name; a corresponding operation scheme 1 of executing the service policy: if the network slice order includes a DNN name, the DNN name is determined as the DNN name, and the DNN and a connection route are configured to be associated based on the description (2) of the service model; or if the network slice order includes no DNN name, the DNN name is set to a "default DNN", and configuration of association with the connection route is added on the default DNN; a condition 2 of executing the service policy: whether the anti-attack filtering function needs to be enabled; an operation scheme 2 of executing the service policy: if the anti-attack filtering function is enabled, the function is enabled and configured for the DNN based on the description (3) of the model; or if the anti-attack filtering function is not enabled, no operation is performed; and a condition 3 of executing the service policy: whether a traffic forced restriction function is enabled, where if the traffic forced restriction function is enabled, a DNN traffic forced restriction is configured based on the model, and an upper limit is the "service capacity requirement" field in the order; or if the traffic forced restriction function is not enabled, no operation is performed.

The orchestration entity generates an NFV-NSD file based on descriptions of the foregoing procedures; deploys a virtual mobile gateway GW-A in the city A based on the NFV-NSD file; allocates two load-sharing service processing virtual machines based on a service capacity; allocates, to the two service processing virtual machines of the GW-A, interface IP addresses CC:DD::1 and CC:DD::2 available in the data center DC-A; and connects interfaces of the two service processing virtual machines and an internal network address CC:DD::111 of the router A to a same VLAN to complete NFV deployment.

The NSCF entity obtains the model, the policy, the plan, the service-related requirement parameter, and registration information reported by the virtual mobile gateway GW-A. The NSCF entity reads the resource policy; and during service address configuration, if determining that the service capacity requirement included in the service-related requirement parameter is greater than the maximum service traffic that is supported by each service address and that is included in the resource model, selects two unallocated service addresses from the address pool in the plan as two service addresses of the virtual mobile gateway. The NSCF entity reads the network policy; and after service address configuration is completed, if determining that the plan of the network slice includes a data center router in a same network segment as the service address, obtains an interface IP address from each virtual machine after NFV deployment, configures an egress route of the mobile office server of the enterprise for each allocated service address based on the description (2) of the network model, obtains, from the plan of the network slice, a router of a data center in which NFV deployment is performed, and configures an ingress route of the mobile office server of the enterprise for each allocated service address based on the description (3) of the network model. The NSCF entity reads the service policy; and when service configuration of a network function is performed, if determining that the network slice order includes a DNN name, configures the DNN and a connection route to be associated based on the description (2) of the service model. In addition, because the anti-attack filtering function needs to be enabled, the anti-attack filtering function is enabled. It should be understood that the foregoing examples are merely intended to help a person skilled in the art better understand the embodiments of the present invention, instead of limiting the scope of the embodiments of the present invention. A person skilled in the art can apparently make various equivalent modifications or changes according to the examples described above, and such modifications or changes also fall within the scope of the embodiments of the present invention.

It should be understood that sequence numbers of the foregoing processes do not mean execution sequences. The execution sequences of the processes should be determined based on functions and internal logic of the processes, and should not be construed as any limitation on the implementation processes of the embodiments of the present invention.

The foregoing describes in detail the network control method in the embodiments of the present invention with reference to FIG. 1 to FIG. 5B. The following describes in detail a network slice control entity in an embodiment of the present invention with reference to FIG. 6 to FIG. 9.

Figure 6:
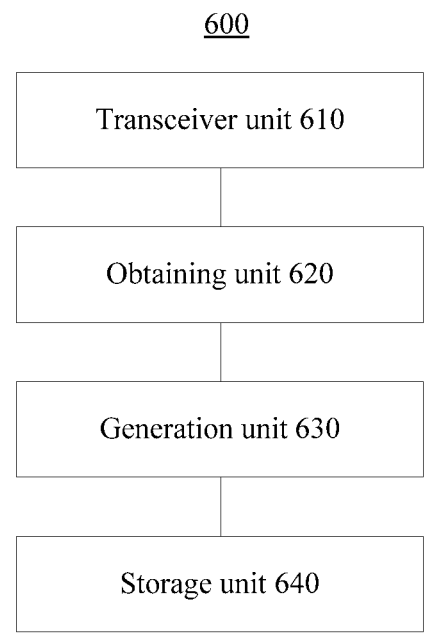
FIG. 6 is a schematic block diagram of a network slice control entity according to an embodiment of the present invention.

FIG. 6 shows a network slice control entity 600 according to an embodiment of the present invention. The network slice control entity 600 includes:

a transceiver unit 610, configured to receive a service deployment command sent by an NSMF entity;

an obtaining unit 620, configured to obtain a service-related requirement parameter, a model, a policy, and a plan of a network slice, and registration information of a network function entity based on the service deployment command; and a generation unit 630, configured to generate a service configuration scheme of the network function entity based on the model and the policy of the network slice and one or more of the service-related requirement parameter, the registration information of the network function entity, and the plan of the network slice, where the transceiver unit 610 is further configured to send the service configuration scheme to the network function entity.

In an optional embodiment, the network slice control entity 600 further includes: a storage unit 640, configured to: store the service-related requirement parameter and the model, the policy, and the plan of the network slice, or store the registration information of the network function entity. In this case, the transceiver unit 610 is further configured to: receive the service-related requirement parameter and the model, the policy, and the plan of the network slice that are sent by the NSMF entity, or receive a registration request that is of the network function entity and that includes the registration information.

In an optional embodiment, the generation unit 630 is further configured to generate an infrastructure network configuration scheme for a virtualized or cloudified infrastructure on which the VNF entity is borne, where the infrastructure network configuration scheme includes switched-network configuration, route configuration, and virtual-interface configuration of the virtualized or cloudified infrastructure. In this case, the transceiver unit 610 is further configured to send the infrastructure network configuration scheme to an orchestration entity.

In an optional embodiment, the generation unit 630 is further configured to generate a network function service configuration scheme based on the model, the policy, and the plan of the network slice and registration information of a VNF service framework. The network service configuration scheme includes a type of a network function service that needs to be deployed on each VNF service framework, a quantity of network function service instances of each type, and an address of a software image of the network function service. In this case, the transceiver unit 610 is further configured to send, to the VNF service framework, a network function service deployment message that includes the network function service configuration scheme.

It should be understood that the network slice control entity 600 herein is implemented in a form of a functional unit. In an optional example, a person skilled in the art may understand that the network slice control entity 600 may be specifically the network slice control entity in the foregoing embodiment. The network slice control entity may be configured to perform procedures and/or steps corresponding to the network slice control entity in the foregoing method embodiment. To avoid repetition, details are not described herein again.

Figure 7:
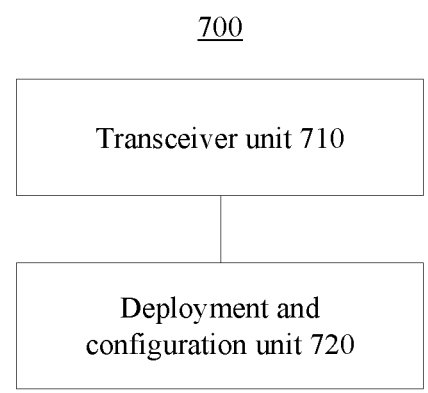
FIG. 7 is a schematic block diagram of an orchestration entity according to an embodiment of the present invention.

FIG. 7 shows an orchestration entity 700 according to an embodiment of the present invention. The orchestration entity 700 includes:

a transceiver unit 710, configured to receive a resource deployment command sent by an NSMF entity; and a deployment and configuration unit 720, configured to: deploy a VNF entity on a virtualized or cloudified infrastructure and configure a network connection of the VNF entity; or deploy a VNF service framework on a virtualized or cloudified infrastructure and configure a network connection of the VNF service framework, according to the resource deployment command.

It should be understood that the orchestration entity 700 herein is implemented in a form of a functional unit. In an optional example, a person skilled in the art may understand that the orchestration entity 700 may be specifically the orchestration entity in the foregoing embodiment. The orchestration entity 700 may be configured to perform procedures and/or steps corresponding to the orchestration entity in the foregoing method embodiment. To avoid repetition, details are not described herein again.

It should also be understood that in the embodiments of the present invention, the term "unit" may be an application-specific integrated circuit (ASIC), an electronic circuit, a processor (for example, a shared processor, a dedicated processor, or a group processor) configured to execute one or more software or firmware programs and a memory, a combinational logic circuit, and/or another appropriate component supporting the described functions.

Figure 8:
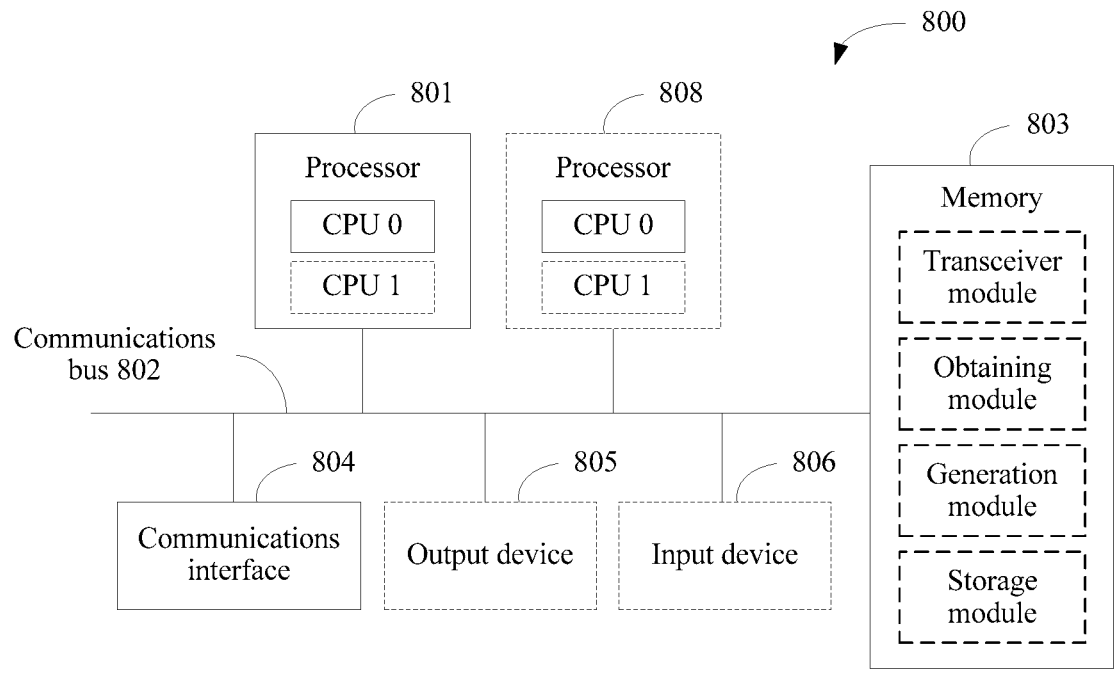
FIG. 8 is a schematic block diagram of another network slice control entity according to an embodiment of the present invention.
Figure 9:
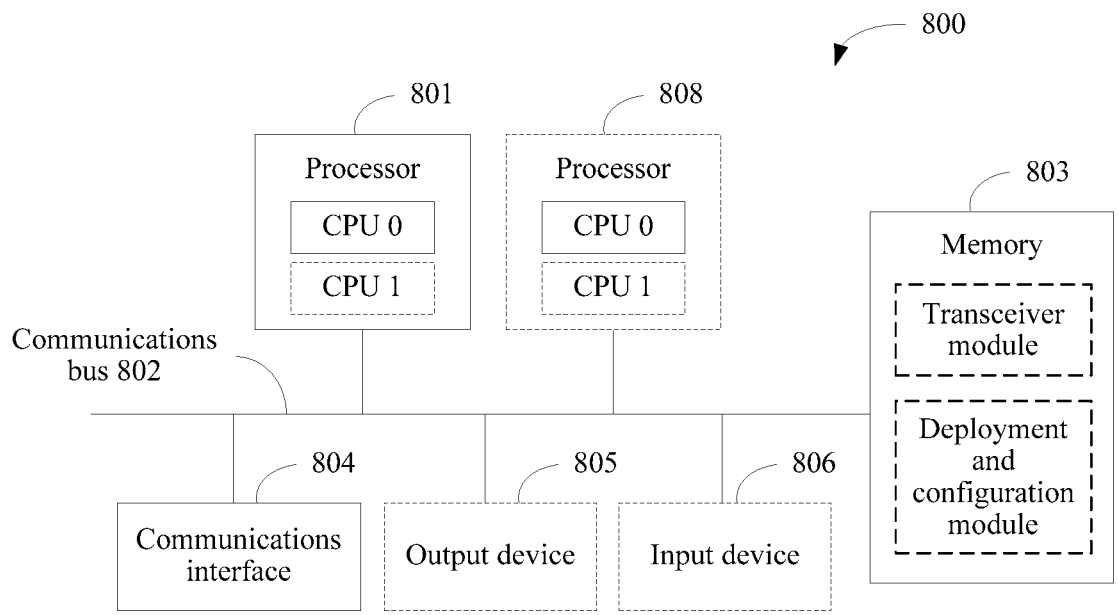
FIG. 9 is a schematic block diagram of another orchestration entity according to an embodiment of the present invention.

FIG. 8 and FIG. 9 are schematic diagrams of computer devices according to an embodiment of the present invention. A computer device 800 includes at least one processor 801, a communications bus 802, a memory 803, and at least one communications interface 804.

The processor 801 may be a general-purpose central processing unit (CPU), a microprocessor, an application-specific integrated circuit (ASIC), or one or more integrated circuits configured to control program execution of the solutions of the present invention.

The communications bus 802 may include a channel used to transfer information between the foregoing components. The communications interface 804 is any device such as a transceiver, and is configured to communicate with another device or a communications network, for example, the Ethernet, a radio access network (RAN), or a wireless local area network (WLAN).

The memory 803 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and that can be accessed by a computer. However, the memory 803 is not limited thereto. The memory may exist independently, and is connected to the processor by using the bus. Alternatively, the memory may be integrated with the processor.

The memory 803 is configured to store application program code used to execute the solutions of the present invention, and the execution is controlled by the processor 801. The processor 801 is configured to execute the application program code stored in the memory 803.

In specific implementation, in an embodiment, the processor 801 may include one or more CPUs, such as CPU 0 and CPU 1 in FIG. 8.

In specific implementation, in an embodiment, the computer device 800 may include a plurality of processors, such as the processor 801 and a processor 808 in FIG. 8. Each of these processors may be a single-core (single-CPU) processor, or may be a multi-core (multi-CPU) processor. The processor herein may be one or more devices, circuits, and/or processing cores used to process data (for example, a computer program instruction).

In specific implementation, in an embodiment, the computer device 800 may further include an output device 805 and an input device 806. The output device 805 communicates with the processor 801, and may display information in a plurality of manners. For example, the output device 805 may be a liquid crystal display (LCD), a light emitting diode (LED) display device, a cathode-ray tube (CRT) display device, or a projector. The input device 806 communicates with the processor 801, and may receive user input in a plurality of manners. For example, the input device 806 may be a mouse, a keyboard, a touchscreen device, or a sensing device.

The foregoing computer device 800 may be a general-purpose computer device or a dedicated computer device. In specific implementation, the computer device 800 may be a desktop computer, a portable computer, a network server, a palmtop computer (PDA), a mobile phone, a tablet computer, a wireless terminal device, a communications device, an embedded device, or a device with a structure similar to that in FIG. 8. A type of the computer device 800 is not limited in this embodiment of the present invention.

The network slice control entity shown in FIG. 1 to FIG. 6 may be the device shown in FIG. 8, and the memory of the network slice control entity stores one or more software modules. The network slice control entity may implement the software module by using the processor and the program code in the memory, to implement network slice creation.

The orchestration entity shown in FIG. 1 to FIG. 5B and FIG. 7 may be the device shown in FIG. 9, and the memory of the orchestration entity stores one or more software modules. The orchestration entity may implement the software module by using the processor and the program code in the memory, to implement network slice creation.

It should be understood that in this embodiment of the present invention, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information of a device type. The processor may be configured to execute the instruction stored in the memory. When the processor executes the instruction, the processor may perform steps corresponding to the terminal device in the foregoing method embodiment.

In an implementation process, steps in the foregoing methods can be implemented by using a hardware integrated logic circuit in the processor, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps of the foregoing method in combination with the hardware in the processor. To avoid repetition, details are not described herein again.

An embodiment of the present invention further provides a communications system. The system may include any policy control function entity in the foregoing embodiments and any policy execution function entity in the foregoing embodiments.

Optionally, the communications system may further include a data storage function entity. The data storage function entity is configured to store at least one piece of the following information: information about at least one deployed instance of each of one or more network function entities, and information about each of at least one physical location at which a network function entity can be deployed. Information about each deployed instance may include at least one piece of the following information: deployment location information, occupied-resource information, information about an enabled processing capability, and capacity utilization information. The information about each physical location includes location information of the physical location and/or available resource information.

Optionally, the communications system may be specifically the communications system shown in FIG. 1, but this is not limited in this embodiment of the present invention.

It should be understood that the foregoing descriptions of the embodiments of the present invention focus on differences between the various embodiments. For same or similar parts that are not mentioned, refer to these embodiments. For brevity, details are not described herein again.

In addition, the terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the function entities are performed by hardware or software depends on particular applications and design constraints of the technical solutions. A person skilled in the art may use different methods to implement the described function entities for each particular application, but it should not be considered that the implementation goes beyond the scope of the present invention.

It may be clearly understood by a person skilled in the art that, for the purpose of convenient and brief description, for a detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function entity division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function entity units in the embodiments of the present invention may be integrated into one processing unit, or each of the units may exist alone physically, or two or more units may be integrated into one unit.

When the function entities are implemented in a form of a software function entity unit and sold or used as an independent product, the function entity units may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for creating a network slice, comprising:
   receiving a service deployment command sent by a network slice management function (NSMF) entity;
   obtaining, based on the service deployment command, a model, a policy, and one or more of: a service-related requirement parameter, a plan of a network slice, or registration information of a network function entity;
   generating a service configuration scheme of the network function entity based on the model and the policy of the network slice and the one or more of: the service-related requirement parameter, the registration information of the network function entity, or the plan of the network slice; and
   sending the service configuration scheme to the network function entity.

2. The method according to claim 1, before the receiving a service deployment command sent by a NSMF entity, further comprising:
   receiving the service-related requirement parameter and the model, the policy, and the plan of the network slice that are sent by the NSMF entity; and
   storing the service-related requirement parameter and the model, the policy, and the plan of the network slice.

3. The method according to claim 1, wherein the model of the network slice comprises one or more of a network model, a resource model, or a service model, wherein the network model indicates network function entities required by each service in a network slice instance and a logical connection relationship between the network function entities; the resource model indicates a correspondence between a service scale and a resource quantity and a correspondence between the service scale and a network bandwidth; and the service model indicates service configuration of each network function entity and a related coordination relationship between the network function entities in terms of service configuration;

the policy of the network slice comprises one or more of a network policy, a resource policy, or a service policy, wherein the network policy comprises location requirement rules of network function entities in a network slice instance and a performance requirement rule of a network bandwidth and a latency between the network function entities; the resource policy comprises a resource occupation rule of a network function entity and a bandwidth use rule of a link of a physical network entity; and the service policy comprises a rule of determining, based on the plan of the network slice and registration information of a network function entity, how to perform service configuration for the network function entity; and the plan of the network slice comprises one or more of the following: a connection plan of a network slice instance and an adjacent network, ora plan of an internet protocol (IP) address of the network slice instance.

4. The method according to claim 1, before the receiving a service deployment command sent by the NSMF entity, further comprising:

receiving, by a network slice control function (NSCF) entity, a registration request that is sent by the network function entity and that comprises the registration information; and storing the registration information of the network function entity.

5. The method according to claim 4, wherein the network function entity is at least one of a virtual network function (VNF) entity, a physical network function (PNF) entity, or a network function service instance running on a VNF service framework.

6. The method according to claim 4, wherein the registration information comprises a network location and a connection topology of the network function entity, and when the network function entity is a VNF entity or a network function service instance running on a VNF service framework, the registration information further comprises resource information.

7. The method according to claim 3, wherein the generating a service configuration scheme of the network function entity based on the model and the policy of the network slice and the one or more of: the service-related requirement parameter, the registration information of the network function entity, or the plan of the network slice comprises:

determining, based on the network model and the one or more of: the service-related requirement parameter, the registration information of the network function entity, or the plan of the network slice, a network configuration relationship between network function entities that have been deployed to meet the network policy;

determining, based on the service model, the network configuration relationship, and the one or more of: the service-related requirement parameter, the registration information of the network function entity, or the plan of the network slice, a service configuration relationship between the network function entities that have been deployed to meet the service policy;

determining, based on the resource model and the one or more of: the service-related requirement parameter, the registration information of the network function entity, or the plan of the network slice, a resource configuration relationship between the network function entities that have been deployed to meet the resource policy; and obtaining a specific service deployment configuration scheme of each of the network function entities.

8. The method according to claim 5, further comprising:

generating a network function service configuration scheme based on the service-related requirement parameter, the model, the policy, and the plan of the network slice, and registration information of the VNF service framework, wherein the network function service configuration scheme comprises a type of a network function service that is to be deployed on each VNF service framework, and a quantity of network function service instances of each type; and sending, to the VNF service framework, a network function service deployment message that comprises the network function service configuration scheme.

9. A system for creating a network slice, comprising a network slice management function (NSMF) entity and a network slice control function (NSCF) entity, wherein the NSMF entity comprises one or more first non-transitory memory storage comprising first instructions; and one or more first hardware processors in communication with the one or more first non-transitory memory storage, wherein the one or more first hardware processors execute the first instructions to send a service deployment command to the NSCF entity; and the NSCF entity comprises:

one or more second non-transitory memory storage comprising second instructions; and one or more second hardware processors in communication with the one or more second non-transitory memory storage, wherein the one or more second hardware processors execute the second instructions to:

receive the service deployment command sent by the NSMF entity;

obtain, based on the service deployment command, a model, a policy, and one or more of: a service-related requirement parameter, a plan of a network slice, or registration information of a network function entity;

generate a service configuration scheme of the network function entity based on the model and the policy of the network slice and the one or more of: the service-related requirement parameter, the registration information of the network function entity, or the plan of the network slice; and send the service configuration scheme to the network function entity.

10. The system according to claim 9, wherein the one or more first hardware processors in the NSMF entity execute the first instructions to send the model, the policy, and the one or more of: the service-related requirement parameter, or the plan of the network slice to the NSCF entity; and the one or more second hardware processors in the NSCF entity execute the second instructions to:

receive the model, the policy, and the one or more of: the service-related requirement parameter, or the plan of the network slice that are sent by the NSMF entity; and store the model, the policy, and the one or more of: the service-related requirement parameter, or the plan of the network slice.

11. The system according to claim 9, further comprising one or more network function entities, wherein the network function entity is further configured to send, to the NSCF entity, a registration request that comprises the registration information; and the one or more second hardware processors in the NSCF entity execute the second instructions to:

receive the registration request that comprises the registration information and that is sent by the network function entity; and store the registration information.

12. The system according to claim 9, wherein the one or more second hardware processors in the NSCF entity execute the second instructions:

determine, based on a network model and the one or more of: the service-related requirement parameter, the registration information of the network function entity, or the plan of the network slice, a network configuration relationship between network function entities that have been deployed to meet a network policy;

determine, based on a service model, the network configuration relationship, and the one or more of: the service-related requirement parameter, the registration information of the network function entity, or the plan of the network slice, a service configuration relationship between the network function entities that have been deployed to meet a service policy is met;

determine, based on a resource model and the one or more of: the service-related requirement parameter, the registration information of the network function entity, or the plan of the network slice, a resource configuration relationship between the network function entities that have been deployed to meet a resource policy; and obtain a specific service deployment configuration scheme of each of the network function entities.

13. The system according to claim 9, further comprising a virtualized or cloudified orchestration entity that is configured to:

receive a resource deployment command sent by the NSMF entity; and deploy a VNF entity on a virtualized or cloudified infrastructure and configure a network connection of the VNF entity, according to the resource deployment command; or deploy a VNF service framework on a virtualized or cloudified infrastructure and configure a network connection of the VNF service framework, according to the resource deployment command.

14. The system according to claim 9, wherein the one or more second hardware processors in the NSCF entity execute the second instructions to:

receive the service deployment command;

obtain the service-related requirement parameter, and the model, the policy, and the plan of the network slice;

generate a network function service configuration scheme based on the service-related requirement parameter, the model, the policy, and the plan of the network slice, and registration information of a VNF service framework, wherein the network function service configuration scheme comprises a type of a network function service that is to be deployed on each VNF service framework, and a quantity of network function service instances of each type; and send, to the VNF service framework, a network function service deployment message that comprises the network function service configuration scheme; and the VNF service framework is configured to:

receive the network function service deployment message sent by the NSCF entity;

install, based on an address of a network function software image, a software image of a network function service that is to be deployed; and load the network function service that is to be deployed.

15. An apparatus for creating a network slice, comprising: at least one processor and a non-transitory memory storing computer-executable instructions, wherein the computer-executable instructions, when executed by the at least one processor, instruct the at least one processor to:

receive a service deployment command sent by a network slice management function (NSMF) entity;

obtain, based on the service deployment command, a model, a policy, and one or more of: a service-related requirement parameter, a plan of a network slice, or registration information of a network function entity;

generate a service configuration scheme of the network function entity based on the model and the policy of the network slice and the one or more of: the service-related requirement parameter, the registration information of the network function entity, or the plan of the network slice; and send the service configuration scheme to the network function entity.

16. The apparatus according to claim 15, wherein the computer-executable instructions instruct the at least one processor to:

receive the model, the policy, and one or more of: the plan of the network slice that are sent by a NSMF entity, and the service-related requirement parameter; and store the model, the policy, and one or more of: the plan of the network slice, and the service-related requirement parameter.

17. The apparatus according to claim 15, wherein the model of the network slice comprises one or more of a network model, a resource model, or a service model, wherein the network model indicates network function entities required by each service in a network slice instance and a logical connection relationship between the network function entities; the resource model indicates a correspondence between a service scale and a resource quantity and a correspondence between the service scale and a network bandwidth; and the service model indicates service configuration of each network function entity and a related coordination relationship between the network function entities in terms of service configuration;

the policy of the network slice comprises one or more of a network policy, a resource policy, or a service policy, wherein the network policy comprises location requirement rules of network function entities in a network slice instance and a performance requirement rule of a network bandwidth and a latency between the network function entities; the resource policy comprises a resource occupation rule of a network function entity and a bandwidth use rule of a link of a physical network entity; and the service policy comprises a rule of determining, based on the plan of the network slice and registration information of a network function entity, how to perform service configuration for the network function entity; and the plan of the network slice comprises one or more of the following: a connection plan of a network slice instance and an adjacent network, or a plan of an internet protocol IP address of the network slice instance.

18. The apparatus according to claim 15, wherein the registration information comprises a network location and a connection topology of the network function entity, and when the network function entity is a VNF entity or a network function service instance running on a VNF service framework, the registration information further comprises resource information.

19. The apparatus according to claim 17, wherein the computer-executable instructions instruct the at least one processor to:

determine, based on the network model and the one or more of: the service-related requirement parameter, the registration information of the network function entity, or the plan of the network slice, a network configuration relationship between network function entities that have been deployed to meet the network policy;

determine, based on the service model, the network configuration relationship, and the one or more of: the service-related requirement parameter, the registration information of the network function entity, or the plan of the network slice, a service configuration relationship between the network function entities that have been deployed to meet the service policy;

determine, based on the resource model and the one or more of: the service-related requirement parameter, the registration information of the network function entity, or the plan of the network slice, a resource configuration relationship between the network function entities that have been deployed to meet the resource policy; and obtain a specific service deployment configuration scheme of each of the network function entities.

20. The apparatus according to claim 15, wherein the computer-executable instructions instruct the at least one processor to:

generate a network function service configuration scheme based on the service-related requirement parameter, the model, the policy, and the plan of the network slice, and registration information of a VNF service framework, wherein the network function service configuration scheme comprises a type of a network function service that is to be deployed on each VNF service framework, and a quantity of network function service instances of each type; and send, to the VNF service framework, a network function service deployment message that comprises the network function service configuration scheme.

* * * * *